US012792860B2

(12) United States Patent
Bhatt et al.

(10) Patent No.: US 12,792,860 B2
(45) Date of Patent: Nov. 10, 2026

(54) METHODS AND PRINTING SYSTEM USING INTELLIGENT RIP I/O FOR PRINTING OPERATIONS

(71) Applicant: Kyocera Document Solutions Inc., Osaka (JP)

(72) Inventors: Jayant Bhatt, Torrance, CA (US); Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 180 days.

(21) Appl. No.: 18/244,636

(22) Filed: Sep. 11, 2023

(65) Prior Publication Data

US 2025/0086418 A1 Mar. 13, 2025

(51) Int. Cl.
*G06K 15/02* (2006.01)
*G06F 3/12* (2006.01)

(52) U.S. Cl.
CPC ..... *G06K 15/1861* (2013.01); *G06K 15/1836* (2013.01)

(58) Field of Classification Search
None
See application file for complete search history.

(56) References Cited

U.S. PATENT DOCUMENTS 5,524,186 A * 6/1996 Campbell .............. G06K 15/02 358/1.14
6,480,295 B1 * 11/2002 Taoda ................ G06K 15/1861 358/1.15
2013/0021636 A1 * 1/2013 Varga ................... G06K 15/401 358/1.14
2013/0050742 A1 * 2/2013 Ward ................. G06K 15/1886 358/1.15
2013/0063765 A1 * 3/2013 Lax ....................... G06F 3/1243 358/1.15
2017/0026538 A1 * 1/2017 Okada .................... G06F 3/1217
2018/0210685 A1 * 7/2018 Kubota ................. G06F 3/1212

FOREIGN PATENT DOCUMENTS

JP 2014138265 * 7/2014 ............... G06F 3/12
JP 2019137018 * 8/2019 ............... H04N 1/00
KR 102462549 * 11/2022 ............... G06F 3/12

* cited by examiner

*Primary Examiner* — Beniyam Menberu
(74) *Attorney, Agent, or Firm* — Millen, White, Zelano & Branigan P.C.; William F. Nixon

(57) ABSTRACT

A front end of a raster image processing (RIP) system decides a starting storage location and a storage hierarchy. The hierarchy dictates where the rendered pages of a job will be stored. At least one page of a first set of pages of a job are stored at a memory for the RIP system. At least one page of a second set of pages of the job are stored in a storage drive when the memory is not available. The type of job also dictates that the rendered pages of the job are stored in the storage drive. Complex pages also are stored in the storage drive while simple pages are discarded. The processing operations are managed so that the print engine is running efficiently.

10 Claims, 15 Drawing Sheets

600
103
Job(s)
302
Front End
604
Page Rendered ?
Yes
No
614
Page Storage Location
612
Page Storage Location
512
Engine Manager
502
Hierarchy
618
Page Printed
418
Renderer
620
Delete Page from Storage
606
Space Available ?
No
608
Next Storage in Hierarchy
Read Page from Storage
616
Yes
610
Write Page
506
508
510
602
Memory
SSD
HDD
Rendered Pages
Rendered Pages
Rendered Pages
630
632
634

METHODS AND PRINTING SYSTEM USING INTELLIGENT RIP I/O FOR PRINTING OPERATIONS

FIELD OF THE INVENTION

The present invention relates to a printing system and associated methods to use a hierarchy of storage drives to provide raster image processing (RIP) input/output (I/O) that handles a variety of print jobs.

DESCRIPTION OF THE RELATED ART

Traditionally, raster image processors (RIP) store all rendered data to disk. Storage of data to a disk ensures that there is a buffer of readily available rendered data to ensure continuity of printing even when there is substantial variability in the processing times for different job pages. While this may be sufficient, this process may be problematic for large jobs that may generate terabytes of rendered data. This amount of rendered data can stress I/O subsystems and limit overall system performance. To address this issue, some RIPs eliminate I/O operations altogether by streaming rendered data from memory to the print heads without an I/O buffer.

While this approach may improve performance for large jobs, it does require hardware that is able to process even the largest jobs at print engine speeds. A definition of hardware specifications around the most complex pages in jobs, which may be the minority of pages in a job, is inefficient. This aspect also may leave the possibility that there may be pages that the hardware cannot process at engine speeds.

SUMMARY OF THE INVENTION

A method for managing printing operations is disclosed. The method includes receiving a print job having a plurality of pages. The method also includes rendering at least one page of a first set of pages of the plurality of pages from the print job using a raster image processing (RIP) system. The method also includes storing the rendered at least one page of the first set of pages in a memory at a printing device receiving the print job. The method also includes determining that the memory is not available. The method also includes rendering at least one page of a second set of pages of the plurality of pages of the print job using the RIP system. The method also includes rendering at least one page of a second set of pages of the plurality of pages of the print job using the RIP system. The method also includes storing the rendered at least one page of the second set of pages in a first storage drive of a hierarchy of storage drives accessible by the printing device. The first storage drive has a higher capacity than the memory.

A method for managing printing operations is disclosed. The method includes rendering at least one page of a first set of pages and at least one page of a second set of pages of a print job by a raster image processing (RIP) system. The method also includes storing the rendered at least one page of the first set of pages in a memory accessible by the RIP system. The method also includes determining that the memory is not available. The method also includes storing the rendered at least one page of the second set of pages in a first storage drive of a hierarchy of storage drives accessible by the RIP system. The first storage drive has a higher capacity than the memory. The method also includes determining that the at least one page of the first set of pages in the memory are printed by the printing device. The method also includes deleting the at least one page of the first set of pages from the memory. The method also includes storing further rendered pages of the print job in the memory.

A method for managing printing operations is disclosed. The method includes receiving a print job having a plurality of pages to be printed by a printing device. The method also includes rendering a first page of the plurality of pages by a raster image processing (RIP) system of the printing device. The method also includes determining whether the first page is a complex page or a simple page. The method also includes, if the first page is a simple page, storing the rendered first page in a memory within the printing device. The method also includes, if the first page is a complex page, storing the rendered first page in a first storage drive of a hierarchy of storage drives accessible by the RIP system. The first storage drive has a higher capacity than the memory.

A method for managing printing operations is disclosed. The method includes receiving a print job having a plurality of pages to be printed at a printing device. The method also includes creating a hierarchy of storage drives where the plurality of pages is to be stored. The method also includes rendering the plurality of pages using a raster image processing (RIP) system for the printing device. The method also includes determining that printing the print job is to be deferred to a subsequent time period depending on a job type of the print job. The method also includes storing the rendered plurality of pages in a first storage drive of the hierarchy of storage drives accessible by the RIP system according to the job type. The first storage drive has a higher capacity storage than a memory accessible by the RIP system.

A method for managing printing operations is disclosed. The method includes receiving a print job having a plurality of copies to be printed at a printing device. The method also includes creating a hierarchy of storage drives where the plurality of pages is to be stored. The method also includes rendering a plurality of pages in a first storage drive accessible by the RIP system. The first storage drive has a higher capacity storage than a memory accessible by the RIP system. The method also includes communicating that the rendered plurality of pages is stored in the first storage drive. The method also includes retrieving the rendered plurality of pages from the first storage drive by an engine manager of the RIP system. The method also includes printing a copy of the plurality of copies of the print job using the rendered plurality of pages. The method also includes determining a final copy of the plurality of copies of the print job is printed. The method also includes deleting the rendered plurality of pages from the first storage drive.

A method for managing printing operations is disclosed. The method includes rendering a print job having a plurality of pages at a raster image processing (RIP) system for a printing device. The method also includes receiving an instruction to suspend rendering of the print job. At least one first page of the plurality of pages has been rendered by the RIP system and stored in a memory accessible by the printing device. The method also includes storing the at least one first page in a first storage drive accessible by the printing device. The method also includes deleting the at least one first page from the memory.

A method for managing printing operations is disclosed. The method includes receiving a print job having a plurality of pages to be printed at a printing device. The method also includes determining that an amount of storage space within a storage location is not available to store the rendered page plurality of pages of the print job. The rendered plurality of pages is processed by a raster image processing (RIP) system. The method also includes, for each page of the plurality of pages, determining whether a page is complex. The method also includes, for each page of the plurality of pages, if the page is complex, adding the page to be stored with the rendered plurality of pages. The method also includes, for each page of the plurality of pages, if the page is not complex, deleting the page from the rendered plurality of pages. The method also includes storing the rendered plurality of pages at the storage location accessible by the RIP system.

A method for managing printing operations is disclosed. The method includes receiving a print job having a plurality of pages at a printing device. The method also includes determining that an amount of storage space within a storage location is not available to store the rendered plurality of pages of the print job. The rendered plurality of pages is processed by a raster image processing (RIP) system. The method also includes, for each page of the plurality of pages, determining a rendering time for a page within the RIP system. The method also includes, for each page of the plurality of pages, if the rendering time is at or above a processing time threshold, adding the rendered page to the rendered plurality of pages. The method also includes, for each page of the plurality of pages, if the rendering time is below the processing time threshold, deleting the page from the rendered plurality of pages. The method also includes storing the rendered plurality of pages at the storage location.

A printing system is disclosed. The printing system includes a printing device having a print engine. The printing device receives a job having a plurality of pages. The printing system also includes a raster image processing (RIP) system to provide rendered pages to the print engine. The printing system also includes a memory to store rendered pages from the RIP system. The printing system also includes a hierarchy of storage drives accessible by the RIP system. The RIP system is configured to render at least one page of a first set of pages of the plurality of pages of the job. The RIP system also is configured to store the rendered at least one page of the first set of pages in the memory. The RIP system also is configured to determine that the memory is not available. The RIP system also is configured to render at least one second page of a second set of pages of the plurality of pages of the job. The RIP system also is configured to store the rendered at least one page of the second set of pages in a first storage drive of the hierarchy of storage drives accessible by the RIP system.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
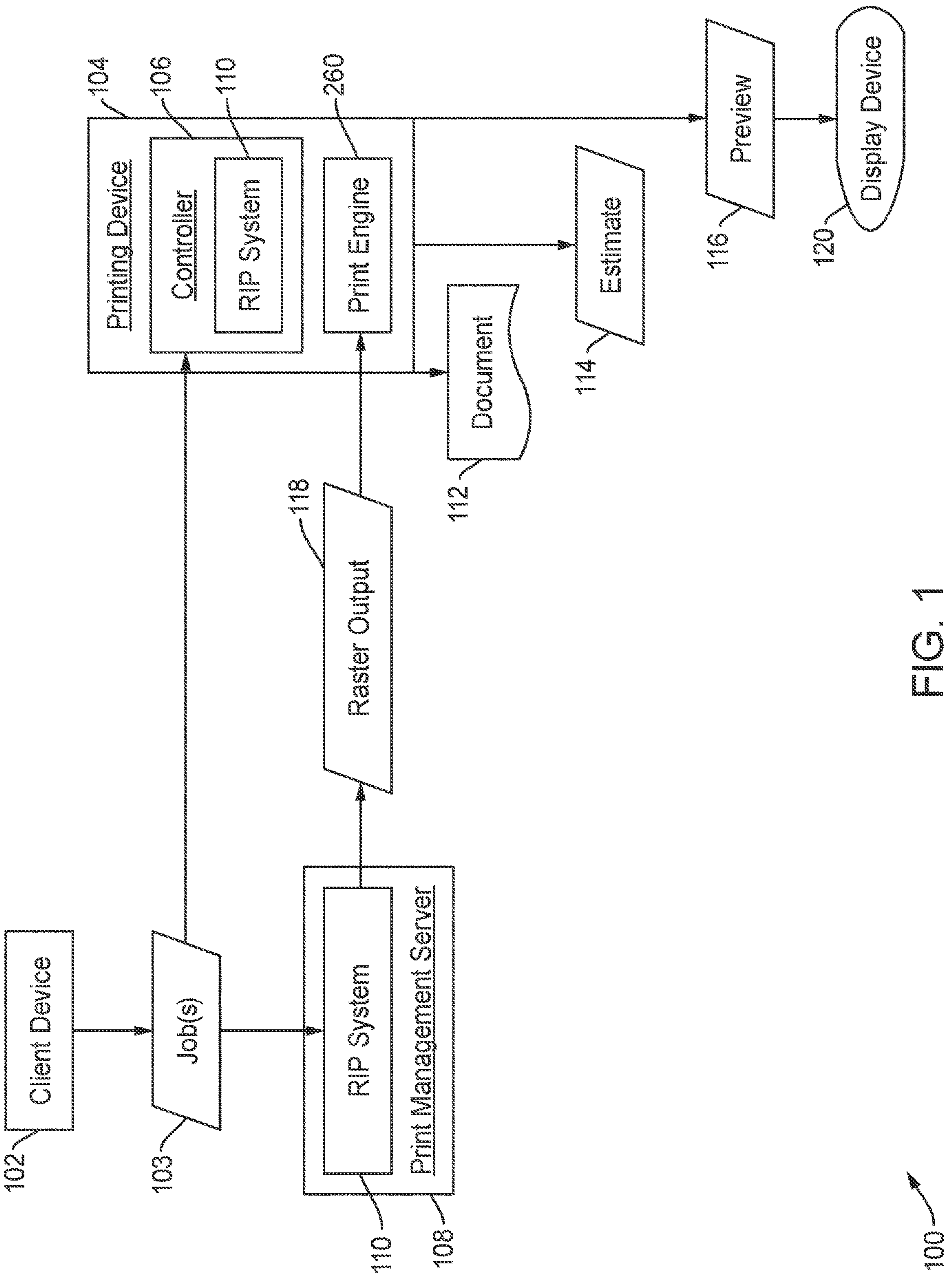
FIG. 1 illustrates a printing system for managing jobs according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

A print job may be composed of a variety of pages. Some of the pages may be simple and rendered at a higher speed compared to the engine speed. Other pages may be complex and take a long time to render. Further, the type of job sent for processing may vary from one job to another. Some of the jobs are required to be printed immediately, while other jobs are only rendered and printed at a later time, or process and hold jobs. Other jobs only may print one copy and hold the remaining copies to be printed on user demand, or a proof and hold job. Other jobs may require multiple copies to be printed. Depending on the type of job, and the difficulty of pages in a job, management of printing operations results in time and storage/space complexity.

The disclosed embodiments provide a RIP system that uses a hybrid I/O, with some pages rendering to memory and other pages rendering into disk storage. Disk storage may refer to high capacity storage drive of a hierarchy of storage drives. Several embodiments may be implemented. In one embodiment, the job pages are processed serially. The pages are rendered into an allocated portion of the host's memory, or the memory of a RIP system or controller of the host printing device.

Rendered pages accrue in the host memory as they are rendered. The pages are deleted as they are sent to the printing device. When there is no additional memory, the disclosed embodiments will store rendered pages in disk storage as this contains a larger capacity than the memory. As pages print and space becomes available, the disclosed embodiments will automatically switch back to storing pages in memory. The disclosed embodiments will alternate between rendering in memory and disk storage based on available space.

In addition to the above, the disclosed embodiments may target rendered content storage to a solid state drive (SDD) or a hard disk drive (HDD) location for selected job actions. Specifically, jobs submitted as "process and hold" or "proof and hold" may be rendered to disk storage. This feature is performed because the job may not be immediately submitted for printing. Saving the job to the higher capacity, but slower, disk storage ensures that the fastest rendered data storage is available for other jobs that may be printed before the processed or proofed job is released to the printing device.

Further, the disclosed embodiments may leverage page processing prediction functionality in order to select the rendering destination for the job. Specifically, the disclosed embodiments may render simple pages to memory and complex pages to disk, or a high capacity storage drive. Because only simple pages are rendered to memory, the disclosed embodiments do not need to alternate between memory and disk when memory is depleted. Instead, the disclosed embodiments may pause rendering as there is no benefit to rendering simple pages ahead of the printing device. Alternatively, the disclosed embodiments may store rendered data from complex pages to disk.

The simple pages may be discarded after printing operations finish while the complex pages may be retained. This feature will improve reprint performance because the controller, or digital front end (DFE), only will need to render pages that can be rendered at engine speed. This action may be done not just for normal printing operations but also for proof and hold as well as process and hold jobs.

Optionally, the disclosed embodiments may use actual rendering time for the pages in order to determine which document pages should be retained after the job is processed or printed. Details of how this would work would depend on how the RIP system is operating. In cases where the RIP system is storing rendered data to disk because of the job action, the disclosed embodiments may choose to discard rendered data for pages that processed above the required engine speed because this data may be regenerated without affecting production.

In cases where the RIP system is alternating between memory and disk locations, the disclosed embodiments may choose to do the same with an additional operation to move complex pages from memory to disk in order to preserve the rendered data for these pages. When using page processing prediction functionality to determine rendered data destination, the disclosed embodiments may still verify the prediction against the actual time taken to process the job. Rendered data for any job that is misclassified as simple may be moved from memory to disk storage.

The disclosed embodiments also may improve processing performance for collated jobs. Specifically, the disclosed embodiments may discard rendered data for all simple pages while retaining data for complex pages. This feature will minimize input/output buffer operations while ensuring that once the first copy is printed, the job always will process at engine speed because the controller, or DFE, only will render simple pages after the first copy is printed.

Thus, the disclosed embodiments address both performance and storage efficiency during the processing of the jobs. One feature of the disclosed embodiments is keeping the print engine occupied and running, so that the engine speed can be achieved for all pages in a job. Another feature is managing the data storage of the rendered pages so that the complex pages are available to the print engine when needed.

The disclosed embodiments manage various storage areas, such as memory and high capacity storage drives such as a solid state drive (SSD) and a hard disk drive (HDD), in the system for the rendered pages. A hierarchy of storage areas is maintained based on the efficiency of the storage I/O, size of storage, and the type of job. The rendering of the job starts with the one storage area, and automatically switches to another storage depending on system events. This feature involves making all components of the system aware as to where a rendered page resides.

According to the disclosed embodiments, the front end of the RIP system decides the starting storage area, storage hierarchy, and informs the renderer about this information. A hierarchy of storage drives dictates which storage that the renderer will use once the starting storage runs out of space. For example, if a page is being rendered to memory, and it runs out of free space, then the hierarchy of storage drives is analyzed. If the hierarchy has memory, SSD, and HDD specified in order, the renderer will start rendering the page to SSD once memory is out of space. After rendering a page to the next storage location in the hierarchy, the renderer goes back to the starting storage for rendering the next page, if free space is already available in the starting storage.

Because a page can be written to any storage, the rendered notifies the front end to which storage location a page is rendered. The front end notifies the engine manager of the storage location, which reads the page from that location to submit to the print engine for printing. After a page is printed, it is deleted from its respective storage location. This feature makes space in the storage area for the renderer to write more pages. The renderer will keep waiting for free space to become available if all storage specified in the hierarchy of storage drives does not have enough space to accommodate more rendered pages.

In the production print market, a long job is one that can print for many days. Such jobs are not uncommon. In order to keep the engine occupied and running without delays, the print system requires pages to be rendered ahead to make sure that a complex page does not become the bottleneck and halt the engine, or time complexity. Because rendering of simple pages may occur at a much faster pace than the engine can print them, the pages can fill up the limited storage faster, or space complexity. In order to solve both time and space complexity, the renderer needs to be occupied and rendering using a tiered approach for using the storage.

For a print job, the pages are rendered and deleted immediately after they are printed. These pages are retained for a finite amount of time. As a result, the front end of the RIP system sets the starting location of rendered pages to a storage location that has the faster I/O, such as a memory and the storage hierarchy as memory, SSD, and HDD. The renderers first will try to write the rendered pages to memory. If space is not available in memory, then the renderers try to write the rendered pages to the SSD, and finally to the HDD.

The "process and hold" job is the type of job that is only rendered and not printed. These pages of this job are printed on user demand. This functionality ensures that the rendering of complex pages does not hold the engine down when the pages are actually printed. Because the time frame of when these rendered pages will be printed is not finite, these pages may not be held in a limited amount of memory. As a result, the front end decides that the pages of the process and hold jobs are rendered in a larger storage area, such as the SSD or HDD storage locations. The front end sets the starting storage as SSD and the storage hierarchy as SSD then HDD. The renderer first will try to write the rendered pages to SSD. If the space is not available in SSD, then the pages are written to HDD.

The "proof and hold" job is the type of job that is rendered but only one copy of the job is printed. The remaining copies of the job are printed on user demand. This functionality is used to proof read a printed copy. If the printout is satisfactory, then the remaining copies are printed. Because the time frame of when the final copy of the job will be printed is not finite, these pages cannot be held in a limited amount of memory. As a result, the front end of the RIP system decides that the pages of proof and hold jobs should be rendered in a larger storage area, such as the SSD or HDD storage locations. The front end sets the starting storage as SSD and the storage hierarchy as SSD then HDD. The renderer first will try to write the rendered pages to SSD. If the space is not available in SSD, then the pages are written to HDD.

The "printing collated copies" action requests that the pages of the job be rendered once, but printed multiple times. The rendered pages of the job only can be deleted after the last copy of the page is printed. Because the page cannot be deleted immediately after the first copy is printed, it occupies the storage area until the last copy is printed. Because all rendered pages of a job are in storage, these pages cannot be held in a limited amount of memory. As a result, the front end of the RIP system decides that the pages of a collated copies job should be rendered in a larger storage area, as the SSD or HDD storage location. The front end sets the starting storage as SSD and the storage hierarchy as SSD then HDD. The renderer first will try to write the rendered pages to SSD. If the space is not available in SSD, then the pages are written to HDD.

A print job rendered to the memory can be suspended by an operator and resumed later. The timeframe as to when this job will be resumed is unknown. The front end of the RIP system stops sending more pages for rendering on a job suspend and also informs the engine manager to stop printing pages. Because the duration of a suspended job is unknown, the already rendered pages cannot be kept in the memory due to limited space. The disclosed embodiments move the rendered pages from the memory to a high capacity storage drive as dictated by storage hierarchy. The front end of the RIP system also may decide to delete simple pages on the job suspend and re-render the deleted pages when the job resumes printing.

FIG. 1 depicts a printing system 100 for managing jobs using RIP system 110 according to the disclosed embodiments. Printing system 100 may be located in a print shop or other environment suitable for production printing operations. Printing system 100 includes one or more printing devices 104 that receive jobs 103 from one or more client terminals 102.

Printing device 104 receives jobs through printing system 100, such as job 103. In some embodiments, job 103 is a print job. After processing job 103, printing device 104 may print or produce document 112 in a paper or media specified by the print job. Printing device 104 is disclosed in greater detail in FIG. 2. Printing device 104 also includes a controller, or digital front end (DFE), 106, which facilitates processing job 103. Controller 106 also includes RIP system 110, which is disclosed in greater detail below.

For example, controller 106 may use RIP system 110 to convert bitmap images, vector graphics, fonts, and the like associated with pages in job 103 to bitmap/rasterized representations of the pages, such as C, M, Y, and K pixels. The sum of the values of pixels of a particular color in the rasterized pages may be proportional to the amount of consumables used by printing device 104 to print that color. RIP system 110 may rasterize pages of job 103 according to various image rasterization settings. For example, these image rasterization parameters may include calibration curves, paper definitions, ICC profiles, spot color definitions, TRCs, color conversion settings, colorant limits for ink or toner, rendering intent, K preservation, CGR level, max colorant densities, print margins, halftones, and the like.

Print engine 260 also is included with printing device 104. Printing device 104 may correspond to an industrial printing device capable of printing thousands of pages in an hour. Printing device 104 may be ink-based, toner-based, or both. Print engine 260 may include various parameters that can control the operation of printing device 104. For example, these settings may include printing device maintenance settings that control or effect head cleaning intervals, head clogging prevention intervals, and the like of printing device 104. Print engine 260 receives raster output from RIP system 110 in printing device 104 to print document 112 based on job 103.

Printing system 100 receive job 103 and may route it directly to printing device 104. Alternatively, printing system 100 may route job 103 to print management server 108. Print management server 108 may seek to offload processing of job 103 from controller 106 of printing device 104. This feature may be desirable if controller 106 does not have the processing capacity to handle jobs 103 in a production printing environment. Thus, print management server 108 also may include RIP system 110 that can provide raster output 118 directly to print engine 260 of printing device 104. These embodiments allow controller 106 to offload processing in order to handle other operations. Further, updates to RIP system 110 may occur at print management server 108 prior to any updates to RIP system 110 in printing device 104.

Job 103 is not always a print job that produces document 112. In some embodiments, job 103 may be an estimation job or a preview job. RIP system 110 determines which type of job is job 103 and configures itself accordingly. For an estimation job, RIP system 110 configures RIPs to process job 103 without impacting print processing within controller 106. The estimation RIPs process job 103 to provide an ink or toner estimate 114. Estimate 114 may be provided to an operator without engaging print engine 260.

For a preview job, RIP system 110 configures RIPs to process job 103 to quickly generate a lower resolution output as preview 116. Preview 116 may be a lower resolution output as compared to document 112 and estimate 114. Preview 116 is provided to the operator to review. Preview 116 may be provided to display device 120 for the operator to review and interact with using an interface.

Display device 120 may be a separate device from client device 102 and printing device 104. In other embodiments, display device 120 may be incorporated within client device 102 or printing device 104.

As disclosed above, RIP system 110 may be a smart system that enables optimal processing by using page complexity determination to handle a variety of jobs 103. Different jobs received at printing device 104 or print management server 108 result in different output, such as document 112, estimate 114, or preview 116. The RIP instances within RIP system 110 are configured according to the type of job 103 is received.

Figure 2:
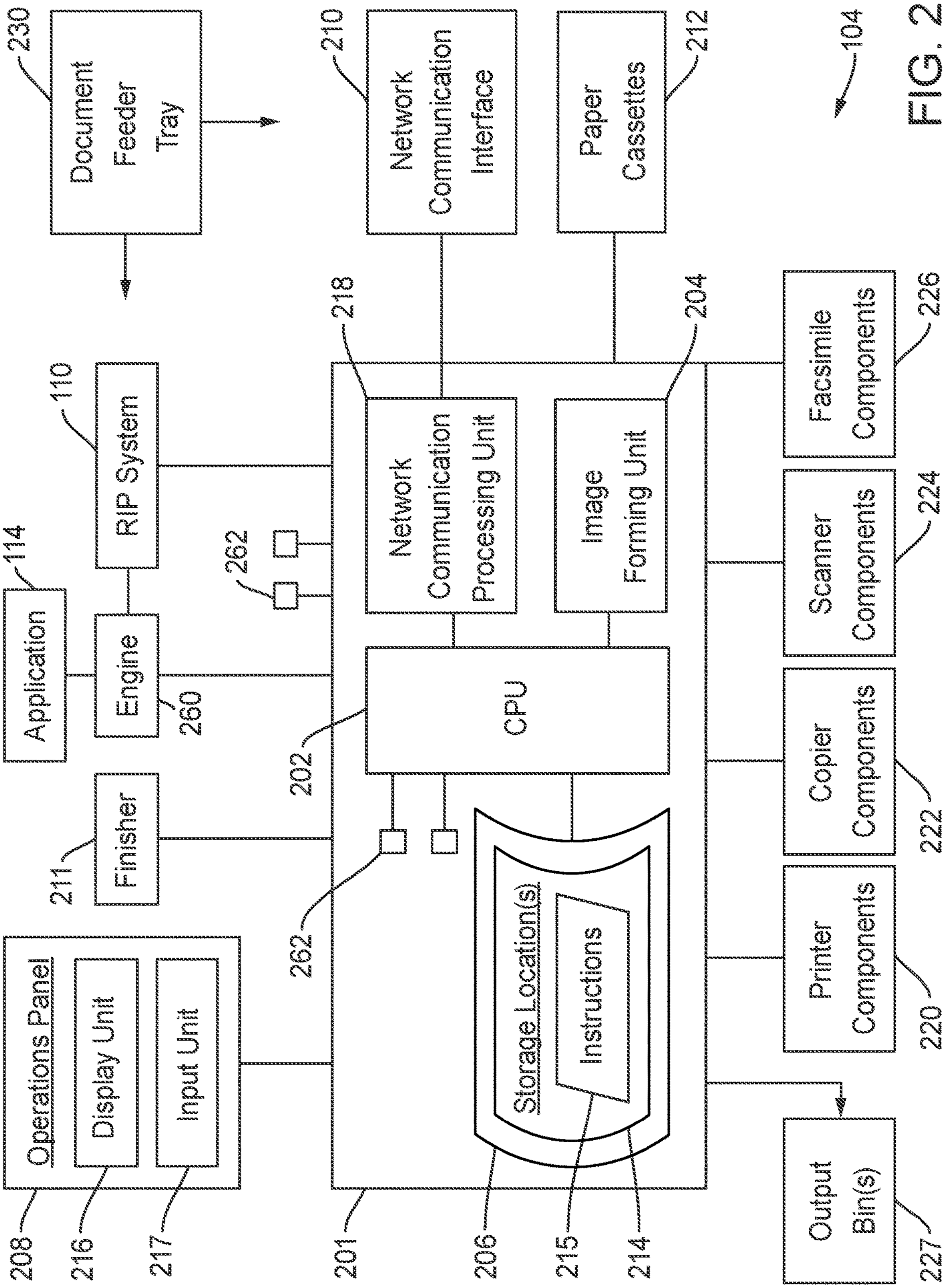
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within printing system 100. As disclosed above, printing device 104 may send and receive data from client device 102, print management server 108, if a separate device, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at controller 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from print management server 108. Display unit 216 may act as display device 120 for displaying preview 116 after it is generated by RIP system 110.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. RIP system 100 that interprets the page description languages (PDLs) would transmit and send instructions down to the lower-level engine 260 for actual rendering of an image and application of the ink onto paper during operations on printing device 104. RIP system 110 may be located in DFE 106, as disclosed above. Alternatively, RIP system 110 may be located on print management server 108 and directly communicates with print engine 260.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from client device 102 and print management server 108 as well as other printing devices within printing system 100.

Figure 3:
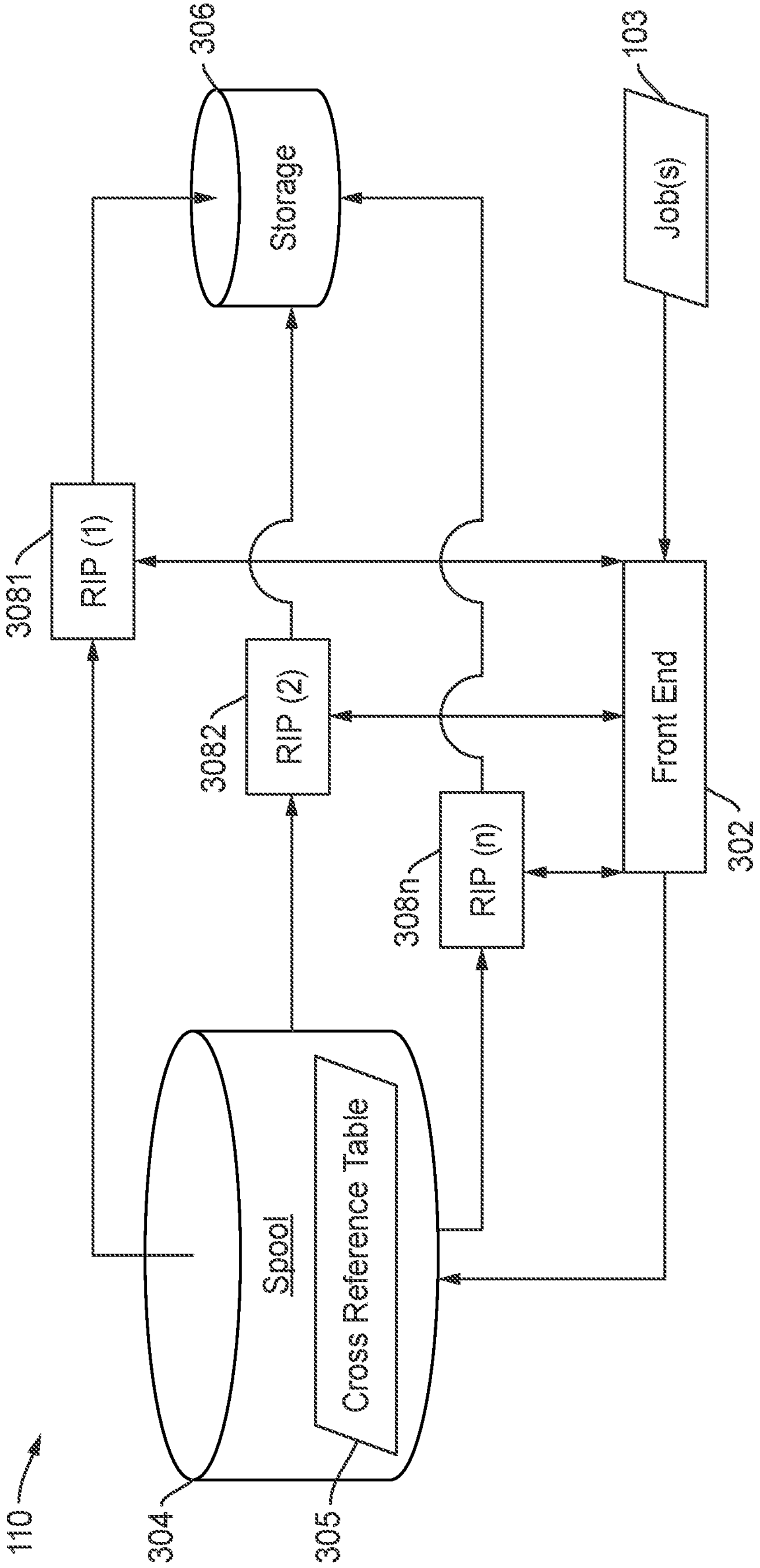
FIG. 3 illustrates a block diagram of a RIP system for use in processing a job in the printing system according to the disclosed embodiments.

FIG. 3 depicts a block diagram of RIP system 110 for use in processing job 103 in printing system 100 according to the disclosed embodiments. As disclosed above, RIP system 110 may be located in controller 106 of printing device 104. It also may be located on print management server 108 such that it communicates directly with print engine 260 of printing device 104.

RIP system 100 include front end 302 and RIP instances RIP 3081, RIP 3082, and RIP **308*n*. A RIP instance may be a RIP configured by front end 302 to process job 103. A RIP instance may be a standard RIP, a high performance RIP, a very high performance RIP, a preview RIP, an estimation RIP, or a failover RIP. All RIP instances and front end 302** operate in parallel to each other.

Front end 302 performs a variety of operations. It may contain multiple subunits that operate in parallel to perform the variety of operations, like spooling job 103, managing job 103, managing pages or segments of job 103, managing RIP instances 3081, 3082, and **308*n*, managing drives, determining the PDL type of job 103, distributing pages of segments of job 103 to the RIP instances, serializing pages or segments of job 103, sending notifications within printing device 104 or print management server 108**.

Front end 302 may receive job 103 through printing system 100. Job 103 may be received from client device 102 via internet protocols within printing system 100. Job 103 may be spooled by front end 302 and stored in spool drive 304. Spool drive 304 may be a configurable drive. Front end 302 determines the PDL type of job 103. It then creates a cross reference table 305 in spool drive 304, which acts as a shared memory with RIP instances 3081, 3082, and **308*n*. Front end 302 also may create print ticket information in spool drive 304**.

Front end 302 analyzes job 103 to determine which type of job it is. It uses this information to determine the number of RIPs and type of RIPs to be used in processing job 103. These features are disclosed in greater detail below. Depending on the type of job, front end 302 configures RIP instances 3081, 3082, and **308*n*. A configuration operation may create a RIP having a certain number of renderers. For example, RIP instance 3081 may be a standard RIP having a normal number of renderers, such as 4. RIP instance 3082 may be a high performance RIP that has a higher number of renders, such as 6. Front end 302 configures the RIP instances accordingly to process job 103**.

Front end 302 then distributes pages or segments of job 103 to RIP instances 3081, 3082, and **308*n*. Job 103 may be a print job that is split into segments or pages for parallel processing. As RIP instance 3082 is a high performance RIP, then it may receive specific pages or segments of job 103. Pages may refer to one or more pages of job 103. Segments of job 103 also may refer to a number of pages or a block of data within job 103. The pages or segments are distributed by front end 302** using inter-process communication.

RIP instances 3081, 3082, and **308*n* may read cross reference table 305 along with print ticket information and the spooled data for job 103. Each RIP instance then processes the page or segment that it is instructed to by front end 302. The RIP instance may check cross reference table 305 to obtain any instructions in the print ticket information and the data for the page or segment in spool drive 304. RIP instances 3081, 3082, and 308***n* then parse the data for the page or segment to create metadata from the drawing commands.

The RIP instances render the metadata to storage 306. Storage 306 may store the rendered pages for a print job of job 103. The rendered pages may be stored according to a specific image format, such as the KYOCERA™ Image Format (KIF). The stored pages may then be provided to print engine 260 to print document 112. For jobs 103 that do not require rendered pages, such as previews and estimates, the data generated by the RIP instances may be provided back to front end 302 for further operations.

RIP system 110 provides advantages over conventional RIP systems. Front end 302 may control the number of renderers per RIP. It may increase the number to process a page or segment faster. It also may increase the amount of memory allocated to the RIP as faster processing consumes more memory. If processing is to be slower, such as for estimate 114 or preview 116, then the configured RIP should consume less memory. Front end 302 manages these requirements through dynamic configuration of the RIPs based on the parameter of job 103.

In some instances, front end 302 may determine that job 103 is not able to be split into pages or segments for parallel processing. Thus, it may configure a RIP instance, such as RIP instance 308*n*, into a very high performance RIP. The very high performance RIP uses more renderers than the high performance RIP. For example, RIP instances 308*n* may be configured to use 8 renderers. This feature increases the processing speed of RIP instance 308*n*. Front end 302 may still use RIP instances 3081 and 3082 for parallel processing on one job 103 while using RIP instance 308*n* for processing another job 103 that is not able to be broken into pages or segments.

RIP system 110 provides features available due to the parallel processing using dynamically configured RIP instances. RIP system 110 may configure a high performance RIP to improve the first page out time. It also may use differently configured RIPs for different purposes, such a preview RIPs, estimation RIPs, and failover RIPs. RIP system 110 also may configure very high performance RIPs for jobs that cannot be processed in a page or segment parallel manner.

RIP system 110 also provides the ability to change the number of renderers per RIP. RIP system 110 also changes the number of RIP instances based on its workload, which includes shutting down certain types of RIPs in order to launch other types of RIPs. RIP system 100 also processes different kinds of jobs in RIPs with different configurations. RIP system 110 also uses different RIPs with different configurations for different purposes. It configures RIP instances with different imaging pipelines. RIP system 110 also retries failed jobs or job pages in a differently configured RIP instance.

Figure 4:
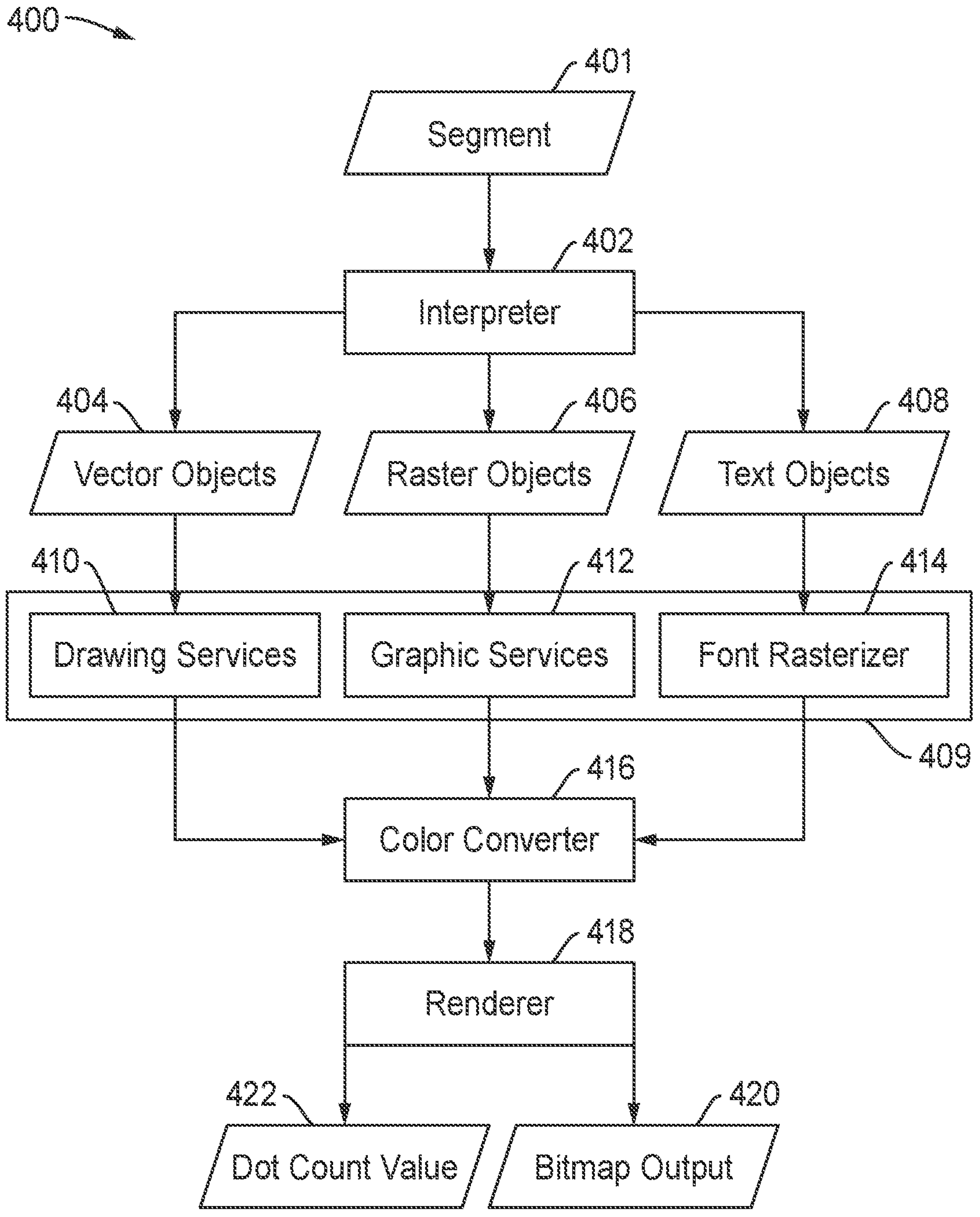
FIG. 4 illustrates a block diagram of an example RIP used within the RIP system according to the disclosed embodiments.

FIG. 4 depicts a block diagram of an example RIP 400 used within RIP system 110 according to the disclosed embodiments. RIP 400 may represent a configuration for RIP instances 3081, 3082, or 308*n*. RIP 400 may represent the hardware and software configuration used to determine what value each pixel or spot of output should possess, driven by commands from a page description language (PDL). Computer-generated output may be composed of very small spots. RIP 400 converts a vector-based image, or a stored image, into a series of mathematical formulas that describe lines and curves into a pattern of spots needed to generate the output, or raster image. Interpreter 402 converts a job file into a display list, which is then converted into a bitmap output 418 describing a page of the document.

RIP 400 converts text and image data from different file formats including PDF, TIFF, or JPEG into a format that printing device 104 can understand. The process of raster image processing a page implements several steps to be performed, regardless whether the page is submitted as PostScript, PDF, or any other page description language (PDL). In short, RIP 400 may provide interpretation, rasterization, and screening.

Segment 401 may be a job file associated with job 103. Segment 401 may be provided to RIP 400 to convert its code into raster or bitmap code. As disclosed above, front end 302 receives job 103. Front end 302 may split job 103 into segments for parallel processing by the RIP instances. Preferably, segment 401 is a page the document in job 103. RIPs process pages in a parallel manner within RIP system 100. RIP 400 is one of the RIP instances. In other embodiments, segment 401 may be several pages, a graphic design, or other portion of job 103.

Segment 401 is received at interpreter 402, which interprets the commands in the code to redraw the object and elements of a page as vector objects 404, raster objects 406, and text objects 408. Interpreter 402 parses specific PDLs into drawing commands. The PDL of segment 401 is read and decoded into graphical elements to be placed on a sheet. Each element may be an image, a character of text, a fill, stroke, and the like or listed in vector objects 404, raster objects 406, and text objects 408.

Drawing unit 409 receives vector objects 404, raster objects 406, and text objects 408 to convert the drawing commands into metadata that can be provided to renderer 418. Thus, drawing unit 409 converts vector objects 404 into drawing services 410. It also converts raster objects 406 into graphic services 412. It also converts text objects into font rasterizer 414.

RIP 400 also may implement color converter 416. Color converter 416 may implement color conversion operations for the metadata generated by drawing unit 409. Color converter 416 provides color management and calibration. These actions may be applied during interpretation or rendering, depending on configuration and job content. Color printing resources may be accessed to provide the color management.

Renderer 418 processes the metadata from drawing unit 409 to convert every graphical element into the appropriate pattern of pixels to form the output raster. The resolution independent vector objects 404 as drawing services 410 are converted into pixels. Screening takes the raster image of pixels to form individually screened cyan, magenta, yellow, and black separations. These are halftone dots in the form of a bitmap output 420 consisting of commands that can be understood by print engine 260.

The disclosed embodiments also may determine dot count value 422 from the rendered image provided by renderer 418. Dot count values may be adjusted based on screening and based on settings at printing device 104. Dot count value 422 may be reported to determine estimate 114 for an estimation job, as disclosed below.

The rendered bitmap output 420 may be stored in storage 306 to be sent to print engine 260 when all the pages or segments of job 103 are processed. RIP 400 shows one path for rendering and providing output. Preferably, RIP 400 multiple rendering paths that use multiple renderers. The disclosed embodiments may use a renderer 418 for each channel in RIP 400, such as one each for cyan, magenta, yellow, and black. The number of renderers 418 may be configured by front end 302 depending on job 103. Each renderer 418 requires memory and processing resources. A high number of renderers 418 in RIP 400 will consume more memory but run faster. A lower number of renderers 418 in RIP 400 will consume less memory but run slower.

Figure 5:
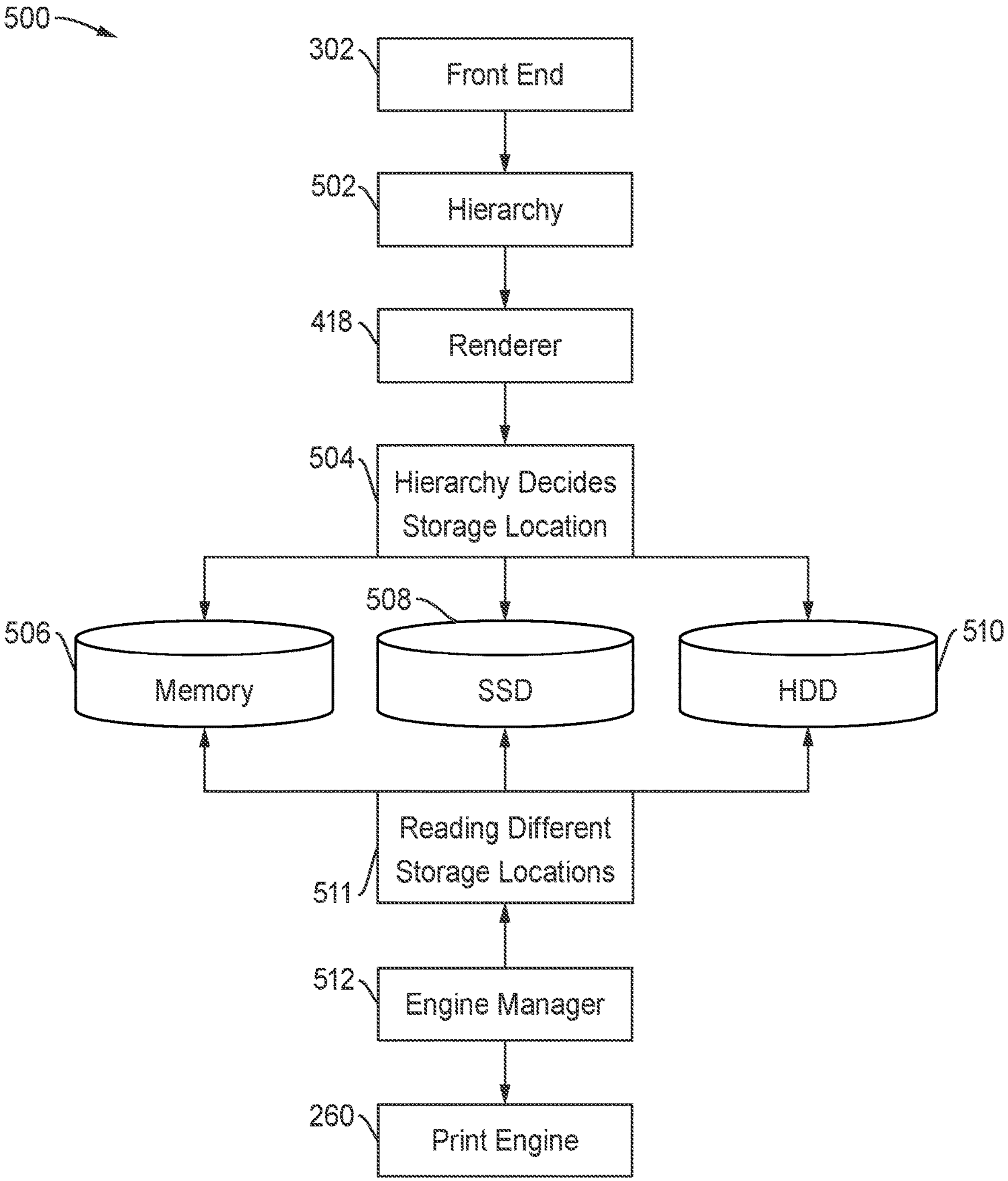
FIG. 5 illustrates a block diagram of a RIP I/O system for use in managing printing operations according to the disclosed embodiments.

FIG. 5 depicts a block diagram of a RIP I/O system 500 for use in managing printing operations according to the disclosed embodiments. RIP I/O system 500 may be part of, or include, components of RIP system 110. In some embodiments, RIP I/O system 500 works in conjunction with RIP system 110 for printing operations. For example, RIP I/O system 500 may include front end 302 and renderer 418, disclosed above. Further, RIP I/O system 500 may include a new component within RIP system 110, or engine manager 512, disclosed in greater detail below.

Front end 302 determines a hierarchy 502 of storage drives. Hierarchy 502 may include the starting storage area and storage hierarchy to be applied during printing operations. Front end 302 may provide hierarchy 502 to renderer 418 of a RIP 400 within RIP system 110. RIP 400 is disclosed above. Front end 302 also may enable operation 504, which states that hierarchy 502 decides the storage location for rendered pages. Renderer 418 implements operation 504 and stores the data for the rendered pages to memory 506, solid state storage (SSD) 508, or hard disk drive (HDD) 510. Memory 506 may correspond to storage 306 disclosed in FIG. 3. Alternatively, storage 306 may refer to all storages that are accessible by RIP system 110 and renderer 418.

Renderer 418 refers to hierarchy 502 as to where and how to store rendered pages. For example, starting storage may be memory 506 as specified by hierarchy 502. Hierarchy 502 also dictates which storage that renderer 418 will use once the starting storage, or memory 506, is not available. Memory 506 may not be available because no storage space is left to receive new data or the memory is offline for some reason. Rendered pages from renderer 418 need to be stored elsewhere.

For example, if a page is being rendered to memory 506 and the storage location runs out of free space, then hierarchy 502 of storage devices is analyzed, preferably by renderer 418. Alternatively, renderer 418 may determine memory 506 is out of space and query front end 302 on what to do. Hierarchy 502 may have memory 506, SSD 508, and HDD 510 in a specified order. Memory 506 is the starting storage while SSD 508 is used once memory 506 is not available and HDD 510 is used once SSD 508 is not available.

In some embodiments, SSD 508 may have a higher storage capacity than memory 506. SSD 508 may be a solid state drive having a semiconductor-based storage that may use NAND flash memory to save persistent data. HDD 510 may be a non-volatile storage drive to retainer stored even when no power applied to the device. HDD 510 also may have a higher storage capacity than memory 506 and SSD 508. SSD 508 and HDD 510 are both storage devices, but operate differently. SSD 508 may be quieter, consume less energy, and faster than HDD 510 but also more expensive. HDD 510 may be cheaper and offer more storage capacity. SSD 508 may store data on instantly-accessible memory chips while HDD 510 is a traditional storage device that uses disks to read and write data.

SSD 508 and HDD 510 also may be external storage accessible by RIP system 110, while memory 506 is within the system. Once memory 506 is not available, such as being filled with rendered page data that has yet to be printed, renderer 418 moves to the next storage device set forth by hierarchy 502. Here, SSD 508 is the next device according to hierarchy 502. After rendering a page to SSD 508, renderer 418 returns to the starting storage, or memory 506, for rendering the next page if free space or memory 506 is available. Pages may have been sent to print engine 260 by engine manager 512 and, therefore, deleted from memory 506. If space is now available at memory 506, then renderer 418 may resume storing rendered pages there again.

In some embodiments, such as large print jobs, SSD 508 also may become unavailable due to running out of space or going offline for some reason. In such an event, renderer 418 may analyze hierarchy 502 to determine that HDD 510 is the default storage after memory 506 and SSD 508. The next rendered page is stored at HDD 510. As disclosed above, front end 302 may indicate that space is available at memory 506 or SSD 508 for storage operations to return there. Because a rendered page may be written into any storage, renderer 418 notifies front end 302 of which storage location that the page is stored.

Front end 302 notifies engine manager 512 at which storage that a rendered page is stored. Front end 302 may notify engine manager 512 of the storage location of a rendered page, either memory 506, SSD 508, or HDD 510. Engine manager 512 reads the rendered page from that location and provides it to print engine 260 for printing. After the page is printed, in some embodiments, it is deleted from its respective storage location to make space available for renderer 418 to write more pages to storage. Renderer 418 will keep waiting for free space to become available in memory 506, SSD 508, and HDD 510 if all storage locations specified by hierarchy 502 are unavailable due to not having enough space or being offline.

Referring to engine manager 512, front end 302 may enact operation 511 to instruct engine manager 512 to retrieve the pages for print job 103 in an order. That order may refer to the different storage locations, memory 506, SDD 508, and HDD 510. For example, print job 103 may include 10 pages. Pages 1-3 are rendered within RIP 400 and stored at memory 506. Memory 506 does not have enough storage to take further pages so renderer 418 checks hierarchy 502 to determine where the next page should be stored. Hierarchy 502 indicates that SSD 508 is the next storage in the hierarchy. Renderer 418 stores rendered page 4 in SSD 508 then checks if space became available in memory 506.

Page 4-6 are rendered within RIP 400. Rendered pages 4-6 are stored at SSD 508 and front end 302 updated with their location. Using the same example, no space is available at SSD 508 so renderer 418 again consults hierarchy 502. Hierarchy 502 indicates that HDD 510 is where renderer 418 is to store rendered pages if memory 506 and SSD 508 are not available according to operation 511. Renderer 418 may store rendered page 7 and 8 at HDD 510 when it becomes aware that space is available at memory 506. Renderer 418 moves back to memory 506 and stores rendered pages 9 and 10 there.

Front end 302 is notified of the different storage locations for the 10 page document:

Pages 1-3—memory 506,
Pages 4-6—SDD 508,
Pages 7 and 8—HDD 510, and
Pages 9 and 10—memory 506.

These locations are provided to front end 302 from renderer 418. Front end 302 provides these locations to engine manager 512. Engine manager 512 reads different storage locations according to operation 511 to retrieve the whole document and provide it to print engine 260 for printing. Engine manager 512 may be the interface between RIP system 110 and print engine 260. It retrieves pages 1-3 from memory 506 then pages 4-6 from SSD 508. Pages 7 and 8 are retrieved from HDD 150. Page 9 and 10 are retrieved from memory 506. Pages 1-10 are printed in order as they are retrieved from their respective storage locations and provided to print engine 260.

Other features and variations may be implemented within the embodiments disclosed below. In some instances, rendered pages may be written into SSD 508 or HDD 510 without the need to determine whether memory 506 is full, depending on the type of print job.

Figure 6:
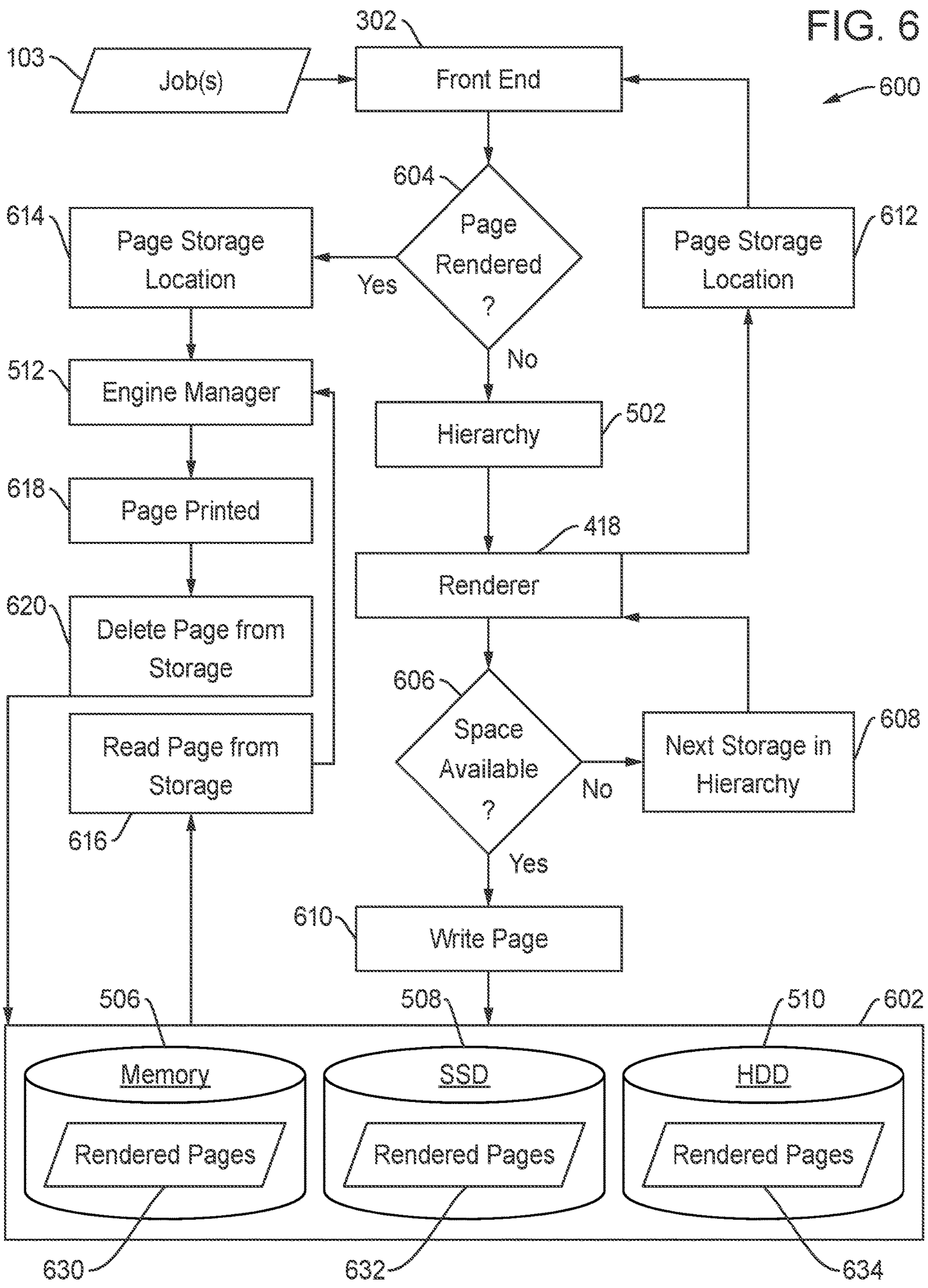
FIG. 6 illustrates a flow diagram for processing a print job using multiple storages according to the disclosed embodiments.

FIG. 6 depicts a flow diagram 600 for processing a print job using multiple storages 602 according to the disclosed embodiments. Multiple storages 602 include memory 506, SSD 508, and HDD 510. As disclosed above, renderer 418 may store rendered pages within each location depending on available storage and hierarchy 502. FIG. 6 shows an example of rendering operations according to the disclosed embodiments.

In production printing, some print jobs may be long print jobs that print on a printing device for hours or even days. In order to keep print engine 260 occupied and printing without delays, the disclosed embodiments may require pages to be rendered ahead of time to make sure that a complex page does not become a bottleneck and halt print engine 260, or time complexity. A complex page is disclosed in greater detail below. For this instance, a complex page may be a page in a document that is rendered slower than the engine speed of print engine 260. Engine speed refers to the printing speed of print engine 260 after it receives a rendered page from engine manager 512.

A non-complex page may be known as a simple page. The rendering of simple pages may occur at faster pace than the engine speed of print engine 260. Rendered simple pages may fill up the limited storage space, or space complexity of memory 506. In order to solve both time and space complexity, renderer 418 needs to be occupied and rendering using a tiered approach for storing rendered pages within multiple storages 602.

For print job 103, the pages of the print job are rendered and deleted immediately after they are printed. These pages are retained for a finite amount of time. As a result, front end 302 sets the starting location of rendered pages from renderer 418 to a storage location that has the fastest I/O, or memory 506. Hierarchy 502, as disclosed above, will set the order of storage locations to memory 506, SSD 508, and HDD 510. Renderer 418 will first try to write the rendered pages of print job 103 to memory 506. If memory 506 is not available, then the rendered pages are stored on SDD 508. If SDD 508 is not available, then the rendered pages may be stored on HDD 510.

Print job 103 is received by front end 302. Print job 103 may include a plurality of pages. These pages may be processed in order by front end 302. Step 604 executes by determining whether a page is already rendered, possibly during a previous iteration of the printing process. If no, then the page needs to be rendered by renderer 418. Further, front end 302 may provide hierarchy 502 to renderer 418. Hierarchy 502 may include starting storage of memory 506 and the hierarchy of multiple storages 602.

Renderer 418 renders the page into a rendered page of data, suitable for use with print engine 260. RIP operations are disclosed above with regard to RIP 400 and RIP system 110. Step 606 executes by determining whether space is available in the current storage location in multiple storages 602. If no, then step 608 executes by proceeding to the next storage in hierarchy 502. Flow diagram 600 returns back to renderer 418, which looks to the next storage listed in hierarchy 502 to determine whether space is available, again in step 606.

If step 606 is yes, then step 610 executes by writing, or storing, the rendered page into the storage as indicated by rendered 418. Page storage location 612 for the written page is provided to front end 302. For example, if a page is rendered by renderer 418, then step 606 determines whether space is available in the storage location currently being used. In this example, the storage location is memory 506. If memory 506 is not available, then step 608 executes by moving to the next storage location in hierarchy 502, which is SDD 508. Renderer 418 then determines that SDD 508 is available so that step 610 writes the page to SSD 508. Page storage location 612 for the page indicates SSD 508 as its location to front end 302.

If step 604 is yes, then the page being considered by front end 302 is already rendered. Perhaps the page was rendered ahead of time using a process disclosed below. Front end 302 has the location of the rendered page based on steps 606-612. Page storage location 614 of the rendered page is provided to engine manager 512. Engine manager 512 executes step 616 by reading the stored page from its storage location. Using the example above, engine manager 512 reads the page from SSD 508.

Engine manager 512 provides the retrieved page to print engine 260 for printing. Step 618 executes by indicating the page is printed. Engine manager 512 is notified that printing is complete by print engine 260. Step 620 executes by deleting the printed page from the appropriate storage location. Using the example above, the printed page is deleted from SSD 508.

Multiple storages 602 includes memory 506, SDD 508, and HDD 510. These storage locations stored rendered pages from renderer 418. These rendered pages are kept at the storage location until they are printed. Engine manager 512 instructs the storage location to delete the printed pages. Thus, memory 506 includes rendered pages 630, SSD 508 includes rendered pages 632, and HDD 510 includes rendered pages 634. The disclosed embodiments use the available space between memory 506, SSD 508, and HDD 510 to process and store rendered pages during long print jobs without causing delay or mismatches of engine speed to rendering speed.

In some embodiments, flow diagram 600 may have hierarchy 502 default back to memory 506 as starting storage for every page. This way, space is checked on memory 506, at least initially, to see if the rendered page may be stored there first, then proceeding to SDD 508, or onto HDD 510. Alternatively, renderer 418 may keep the current storage location for the next page so that pages are kept in order until a change in storage hierarchy is needed.

Figure 7:
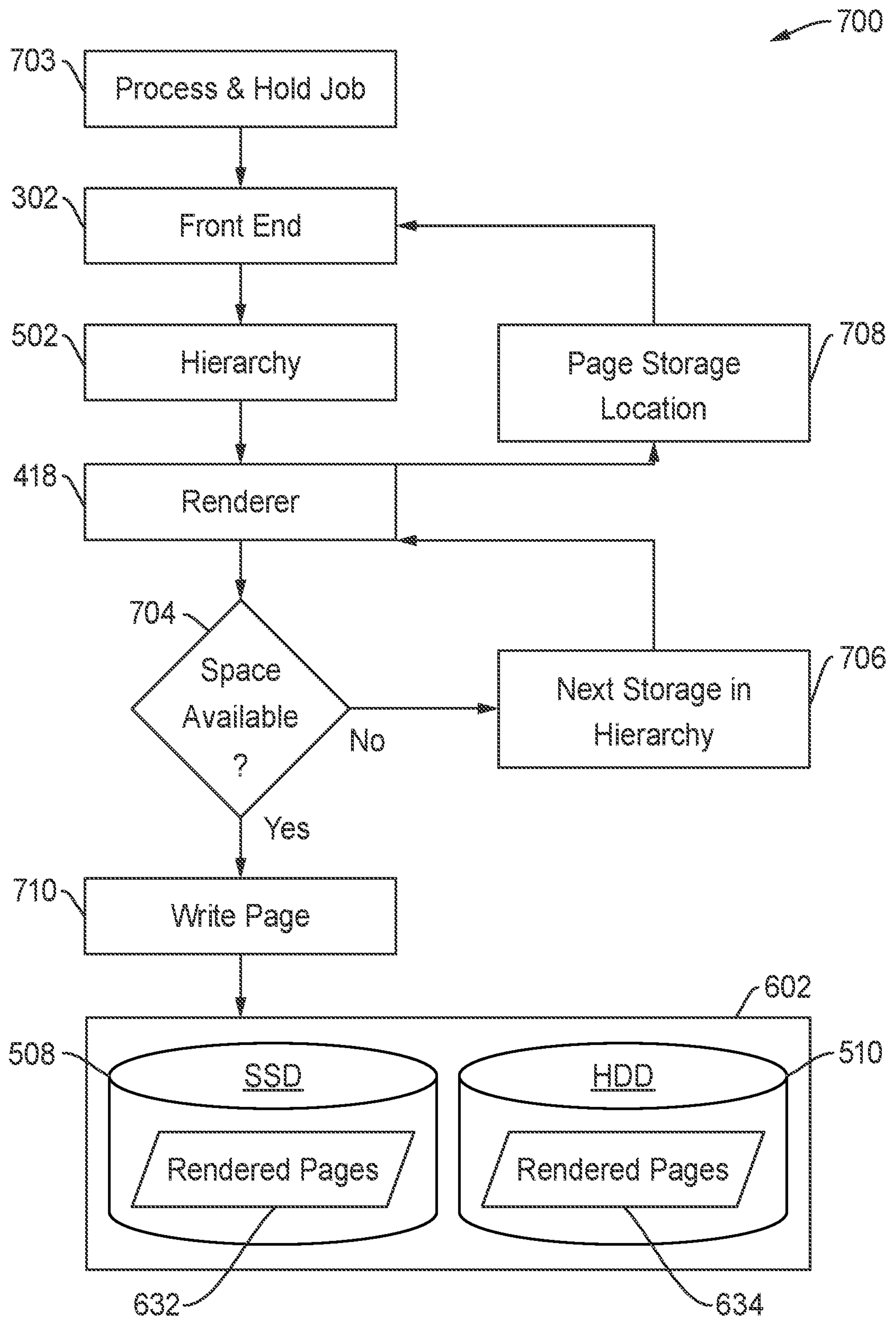
FIG. 7 illustrates a flow diagram for managing printing operations for a process and hold print job according to the disclosed embodiments.

FIG. 7 depicts a flow diagram 700 for managing printing operations for a process and hold print job 703 according to the disclosed embodiments. Flow diagram 700 may refer to FIGS. 1-6 for illustrative purposes. Flow diagram 700, however, is not limited to the embodiments disclosed by FIGS. 1-6.

Process and hold job 703 is received at printing device 104 and provided to front end 302 of RIP system 110.

Process and hold job 703 may correspond to print job 103 disclosed above, but the process and hold term is used here as it describes the type of job. Further, a process and hold job is not a "print job" in that it is received and printed. A process and hold print job is the type of job that only may be rendered but may not be printed. The pages are printed on operator demand. This feature ensures that the rendering of complex pages do not tie up print engine 260 when the pages are actually printed. Because the time frame to print the rendered pages is not finite, the rendered pages cannot be held in a limited amount of memory after processing through RIP system 110.

As a result of the print job being process and hold job 703, front end 302 may direct that these type of jobs, when rendered, are stored in bigger storage locations, such as SSD 508 and HDD 510. Thus, storage locations 602 for process and hold job 703 may only include SSD 508 and HDD 510. Front end 302 may set the starting storage as SSD 508 and the storage hierarchy as SSD 508 then HDD 510 in hierarchy 502. Front end 302 may provide hierarchy 502 to renderer 418. According to hierarchy 502, renderer 418 first will try to write the rendered pages of process and hold job 703 to SSD 508. If SSD 508 is not available, then the rendered pages are written to HDD 510.

Thus, for each page, step 704 executes by determining whether space is available in the starting storage, or, in this case, SSD 508. If no, then step 706 is executed by moving to the next storage in hierarchy 502. In this instance, the next storage is HDD 510. Renderer 418 will update its storage location to HDD 510 and repeat step 704. Further, for this page, renderer 418 provides page storage location 708 to front end 302 to indicate that the pages, and possibly subsequent pages, will be written to HDD 510.

If step 704 is yes, then page storage location 708 is provided to front end 302 and step 710 executes by writing the page to the appropriate storage location. If the storage location is SSD 508, then the page will be stored with rendered pages 632. If the storage location is HDD 510, then the page will be stored with rendered pages 634. As disclosed above, renderer 418 will start by writing rendered pages to rendered pages 632 but switch to rendered pages 634 if SSD 508 is not available due to limited storage capabilities or some other reason.

Figure 8:
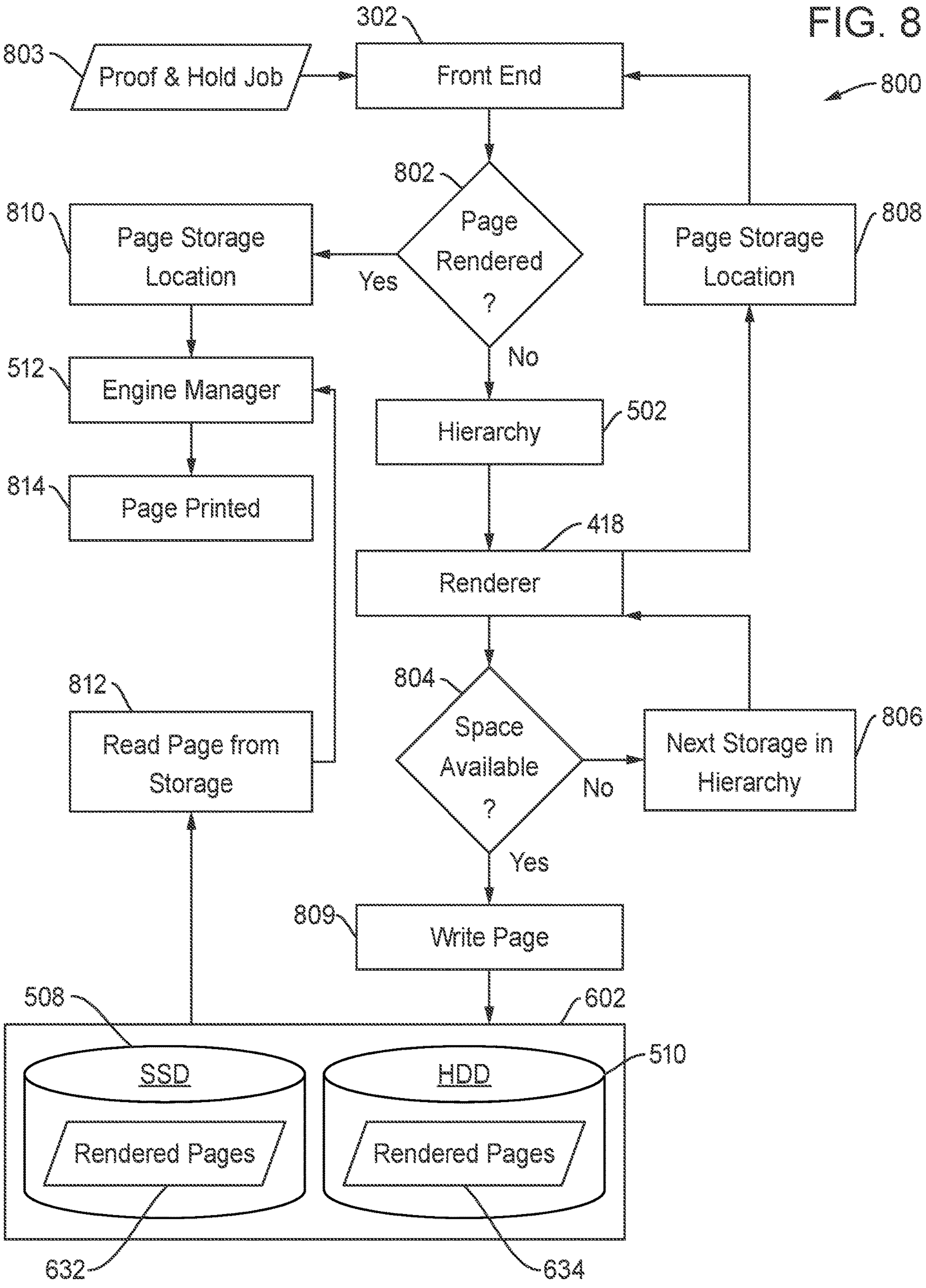
FIG. 8 illustrates a flow diagram for managing printing operations for a proof and hold job according to the disclosed embodiments.

FIG. 8 depicts a flow diagram 800 for managing printing operations for a proof and hold job 803 according to the disclosed embodiments. Flow diagram 800 may refer to FIGS. 1-7 for illustrative purposes. Flow diagram 800, however, is not limited to the embodiments disclosed by FIGS. 1-7.

Proof and hold job 803 is received at printing device 104 and provided to front end 302 of RIP system 110. Proof and hold job 803 may correspond to print job 103 disclosed above, but the proof and hold term is used here as it describes the type of job. A proof and hold job is the type of job that is rendered, but only one copy of the job is printed. The printed copy is used to "proof" the job so that changes may be made, if needed, before the rest of the copies are printed. The remaining copies are printed on operator demand.

Because the time frame when the final copy of the job will be printed is not finite, the rendered pages for proof and hold job 803 may not be held in the limited amount of storage available to memory 506. As a result, front end 302 decides that the rendered pages of proof and hold jobs should be stored in larger storage locations, such as SSD 508 and HDD 510. Front end 302 sets the starting storage as SSD 508 and the storage hierarchy as SSD 508 then HDD 510 in hierarchy 502. Memory 506 is not considered. Renderer 418 first will try to write the rendered page to SSD 508. If SSD 508 is not available, then rendered 418 will write the rendered page to HDD 510.

Thus, proof and hold job 803 will be received at printing device 104 and provided to RIP system 110 for processing. Front end 302 determines that the received job is a proof and hold type job and instructs renderer 418 to use hierarchy 502 with the starting storage as SSD 508 and the hierarchy as SSD 508 then HDD 510. Front end 302 may consider each page of proof and hold job 803. Step 802 executes by determining whether the page is already rendered. If no, then the page is provided to RIP 400 having renderer 418 to be processed into a rendered page suitable for printing operations.

Renderer 418 uses hierarchy 502 to determine that the starting storage for storing rendered pages is SSD 508. Thus, step 804 executes by determining whether space is available at SSD 508 as the storage location specified by hierarchy 502. SSD 508 also may not be available for other reasons, such as being offline. If step 804 is yes, then step 809 executes by writing the page to SSD 508. If step 804 is no, then step 806 executes by moving to the next storage specified in hierarchy 502. In this instance, the next storage is HDD 510. Renderer 418 will adjust its storage location to HDD 510 and provide page storage location 808 to front end 302 for this page.

Step 804 is repeated to determine that space is available in HDD 510. If step 804 is yes, then renderer 418 executes step 809 by writing the page to HDD 510. If step 804 is no, then renderer 418 may need to check on SSD 508. If space is not available, then hierarchy 502 may instruct renderer 418 to query SSD 508 to see if space is now available. Some pages may have been deleted to free up space.

Referring back to step 802, if the page is already rendered based on a previous operations, then page storage location 810 will be provided by front end 302 to engine manager 512. Engine manager 512 will use page storage location 810 to query the appropriate multiple storages 602 for the rendered page. Step 812 executes by reading the page from the appropriate storage location, either SSD 508 or HDD 510. Engine manager 512 will provide the rendered page to print engine 260. Step 814 executes by printing the rendered page. In some embodiments, engine manager 512 may instruct the rendered page to be deleted from rendered pages 632 or rendered pages 634.

Figure 9:
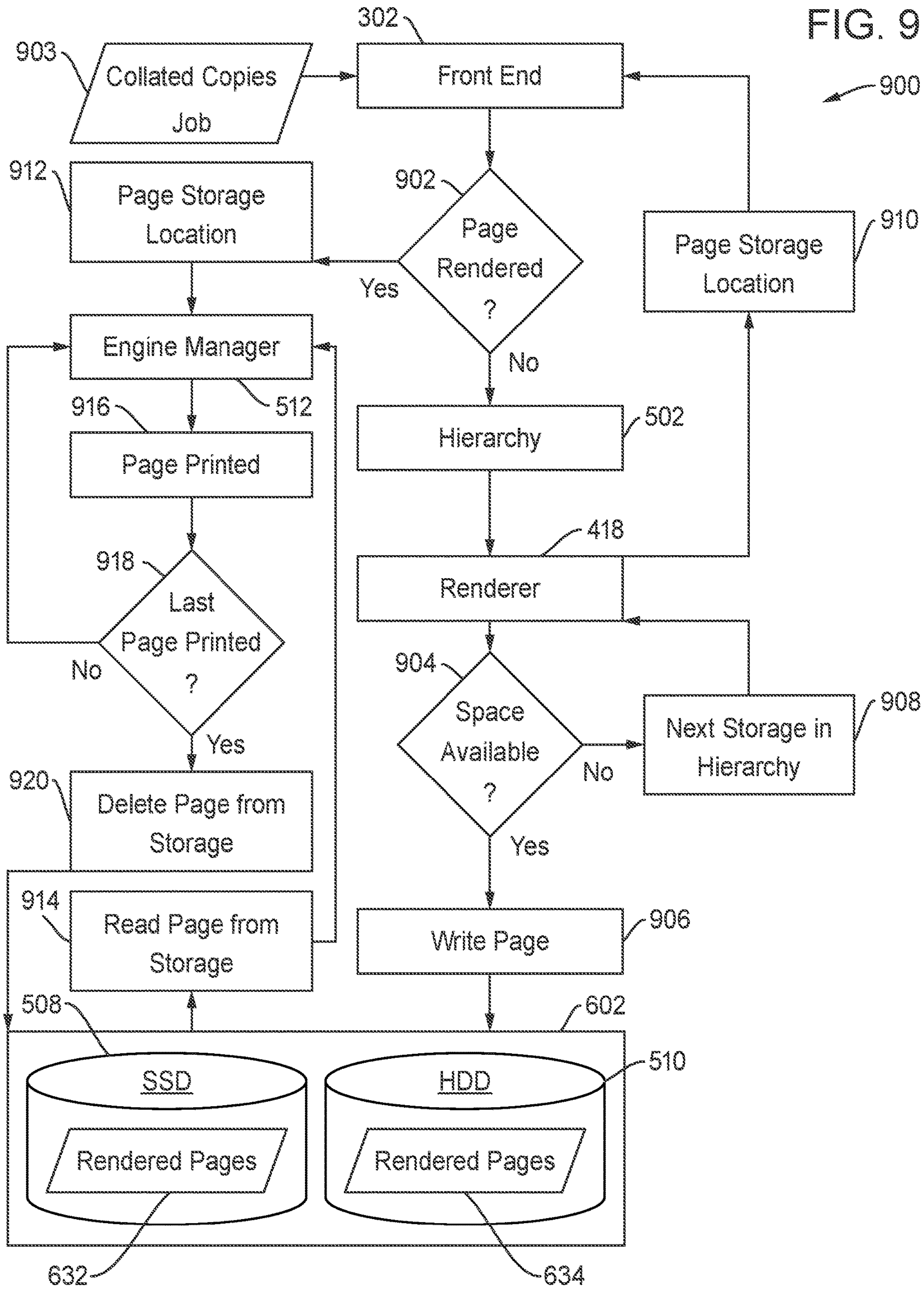
FIG. 9 illustrates a flow diagram for managing printing operations for a collated copies job according to the disclosed embodiments.

FIG. 9 depicts a flow diagram 900 for managing printing operations for a collated copies job 903 according to the disclosed embodiments. Flow diagram 900 may refer to FIGS. 1-8 for illustrative purposes. Flow diagram 900, however, is not limited by the embodiments disclosed by FIGS. 1-8.

Collated copies job 903 is received at printing device 104 and provided to front end 302 of RIP system 110. Collated copies job 903 may correspond to print job 103 disclosed above, but the collated copies term is used here as it describes the type of job. A collated copies job requires the pages of the job to be rendered once, but printed multiple times. In other words, collated copies job 903 may include a plurality of copies for a document. The rendered pages of collated copies job 903 only may be deleted after the last copy of the page is printed.

Because the page may not be deleted immediately after the first print, the rendered page occupies the storage location until all pages are printed. These pages may not be held in a limited amount of memory because all rendered pages of a job are in the storage. As a result, front end 302 decides that the pages of collated copies job 903 should be written into a large storage location than memory 506, such as SSD 508 and HDD 510. Front end 302 sets the starting storage as SSD 508 and the storage hierarchy as SSD 508 then HDD 510 in hierarchy 502. Memory 506 is not considered. Renderer 418 first will try to write the rendered page to SSD 508. If SSD 508 is not available, then rendered 418 will write the rendered page to HDD 510.

Thus, collated copies job 903 will be received at printing device 104 and provided to RIP system 110 for processing. Front end 302 determines that the received job is a collated copies type job and instructs renderer 418 to use hierarchy 502 with the starting storage as SSD 508 and the hierarchy as SSD 508 then HDD 510. Front end 302 may consider each page of collated copies job 903. Step 902 executes by determining whether the page is already rendered. If no, then the page is provided to RIP 400 having renderer 418 to be processed into a rendered page suitable for printing operations.

Renderer 418 uses hierarchy 502 to determine that the starting storage for storing rendered pages is SSD 508. Thus, step 904 executes by determining whether space is available at SSD 508 as the storage location specified by hierarchy 502. SSD 508 also may not be available for other reasons, such as being offline. If step 904 is yes, then step 906 executes by writing the page to SSD 508. If step 904 is no, then step 908 executes by moving to the next storage specified in hierarchy 502. In this instance, the next storage is HDD 510. Renderer 418 will adjust its storage location to HDD 510 and provide page storage location 910 to front end 302 for this page.

Step 904 is repeated to determine that space is available in HDD 510. If step 904 is yes, then renderer 418 executes step 906 by writing the page to HDD 510. If step 904 is no, then renderer 418 may need to check on SSD 508. If space is not available in HDD 510, then hierarchy 502 may instruct renderer 418 to query SSD 508 to see if space is now available. Some pages may have been deleted to free up space.

Referring back to step 902, if the page is already rendered based on a previous operations, then page storage location 912 will be provided by front end 302 to engine manager 512. Engine manager 512 will use page storage location 912 to query the appropriate multiple storages 602 for the rendered page. Step 914 executes by reading the page from the appropriate storage location, either SSD 508 or HDD 510. Engine manager 512 will provide the rendered page to print engine 260. Step 916 executes by printing the rendered page. In some embodiments, engine manager 512 may instruct the rendered page to be deleted from rendered pages 632 or rendered pages 634.

Step 918 executes by determining whether this page is the last page printed for the last copy to be printed for collated copies job 903. For example, collated copies job 903 may include 1000 copies of a document. A page in the document should be printed 1000 times. Thus, the page cannot be deleted from its storage location, either SSD 508 or HDD 510, until the final copy is printed. Thus, step 918 determines whether this print instance is the last one needed to complete collated copies job 903. If no, then flow diagram 900 returns to engine manager 512 to print additional pages. If step 918 is yes, then step 920 executes by deleting the page from the appropriate storage location.

Figure 10:
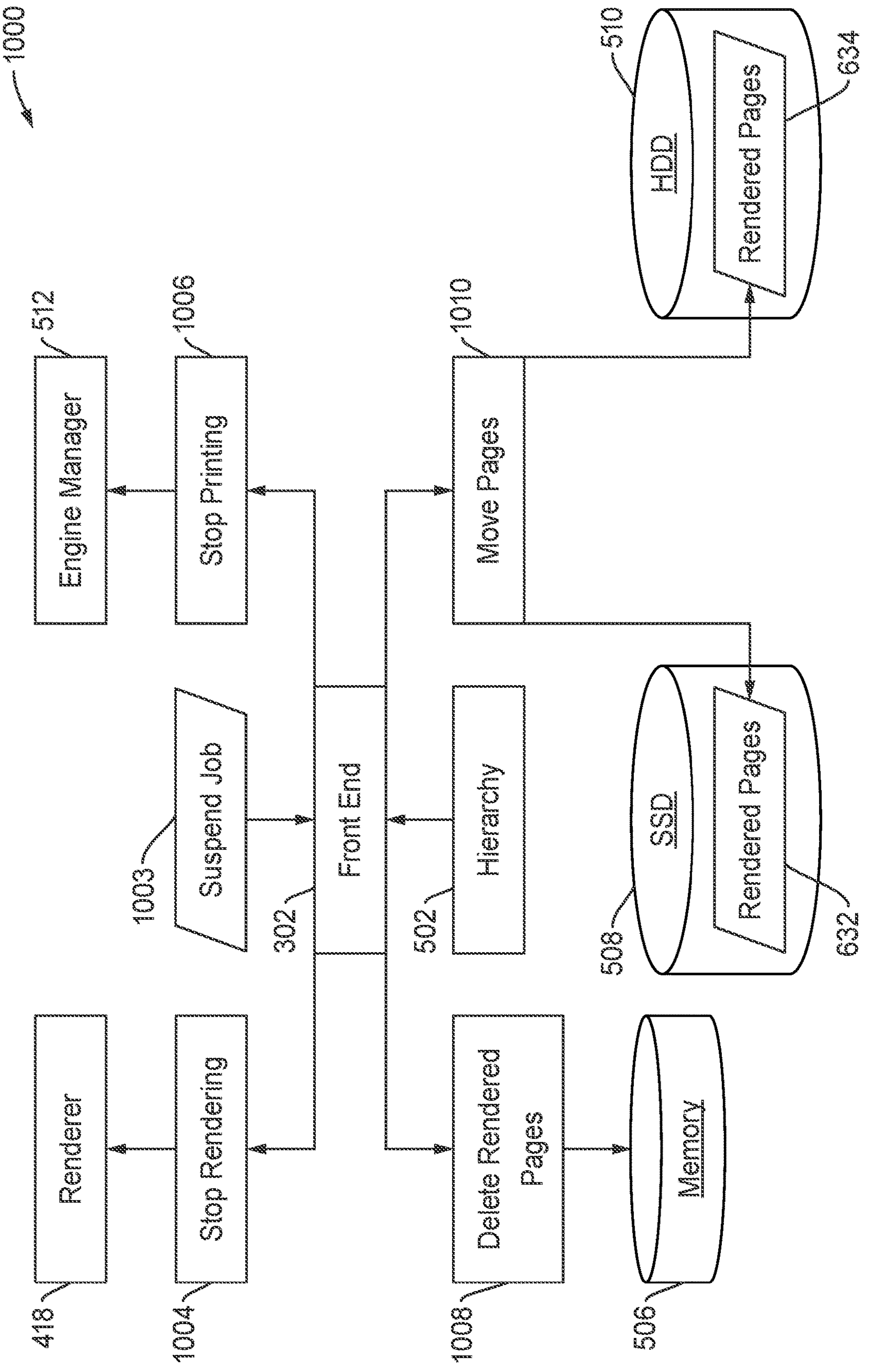
FIG. 10 illustrates a flow diagram for reconfiguring a storage location when suspending a print job according to the disclosed embodiments.

FIG. 10 depicts a flow diagram 1000 for reconfiguring a storage location when suspending a print job according to the disclosed embodiments. Flow diagram 1000 may refer to FIGS. 1-9 for illustrative purposes. Flow diagram 1000, however, is not limited to the embodiments disclosed by FIGS. 1-9.

A print job, such as print job 103, process and hold job 703, proof and hold job 803, or collated copies job 903, may be suspended by the operator to be resumed later. For simplicity, the disclosed embodiments will refer to print job 103 below. Print job 103 may be rendered to memory 506 as part of normal printing operations when a suspend job instruction 1003 is received at front end 302.

As a result of suspend job instruction 1003, step 1004 executes by front end 302 stopping from sending more pages for rendering to RIP 400 and instructing renderer 418 to stop rendering. Step 1006 also executes by stopping printing of print job 103. Front end 302 informs engine manager 512 to stop sending pages to print engine 260. Because the duration of the suspended job is unknown, the already rendered pages, or rendered pages 630, cannot be kept in memory 506. The disclosed embodiments move the rendered pages for print job 103 within rendered pages 630 from memory 506 to a storage drive, as defined by hierarchy 502. Front end 302 also may delete simple, or non-complex, pages on the job suspend and re-render the deleted pages when print job resumes printing.

Thus, step 1008 executes by deleting the rendered pages from rendered pages 630 in memory 506 to free up this space for other printing operations on printing device 104. Step 1010 executes by moving the pages deleted in step 1008 to either rendered pages 632 of SSD 508 or rendered pages 634 of HDD 510. Hierarchy 502 may specify which storage location to use. For example, hierarchy 502 may define SSD 508 as receiving the deleted pages. If SSD 508 is not available, then the deleted pages may be stored on HDD 510.

If some of the rendered pages for suspended print job 103 are not complex, then these may not be stored in SSD 508 or HDD 510 as they can be rendered when printing operation resume without severely limiting print engine 260. The determination of a complex page is disclosed in greater detail below.

Figure 11:
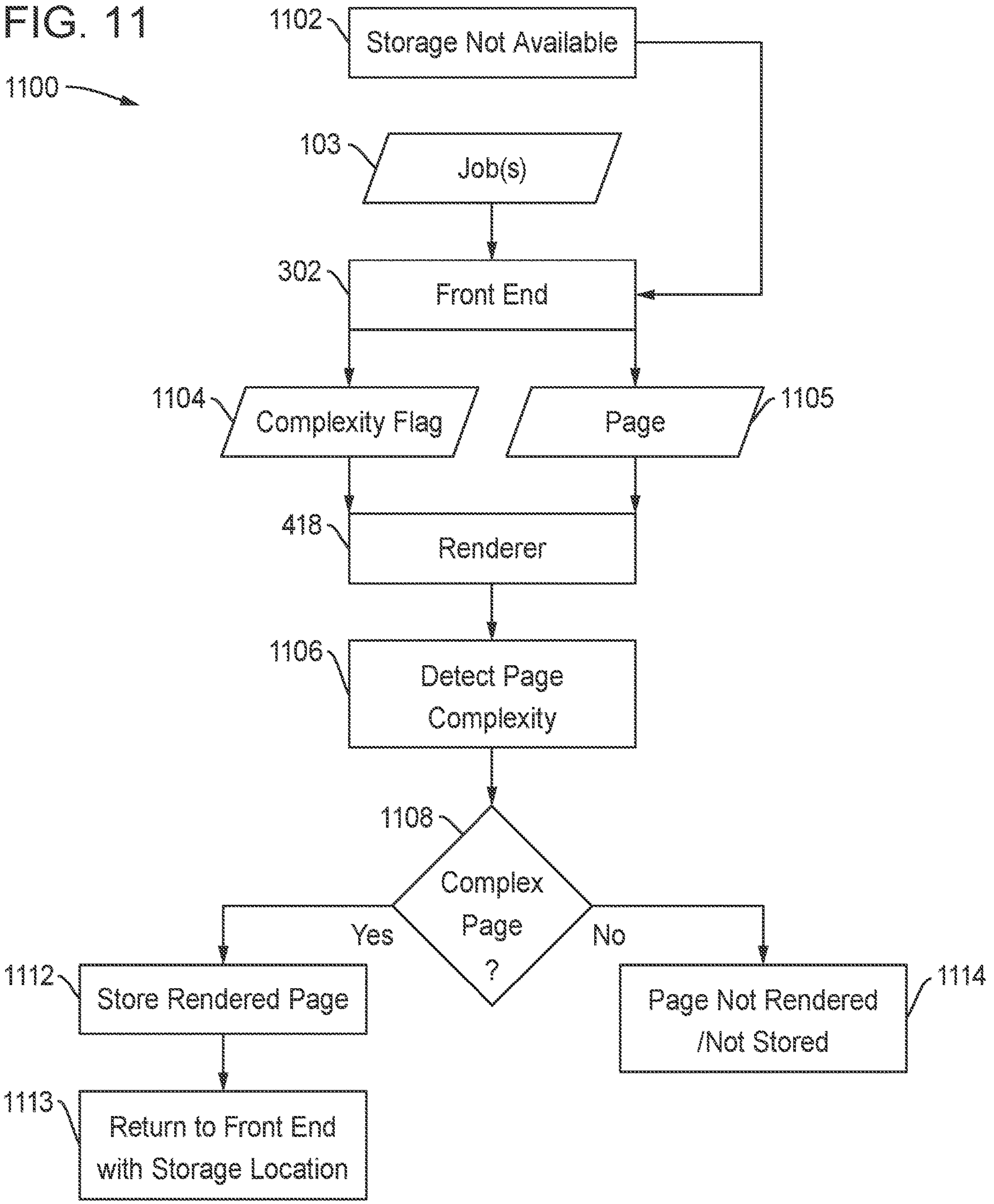
FIG. 11 illustrates a flow diagram for page complexity detection in a RIP system to manage printing operations according to the disclosed embodiments.

FIG. 11 depicts a flow diagram 1100 for page complexity detection in RIP system 110 to manage printing operations according to the disclosed embodiments. Flow diagram 1100 may refer to FIGS. 1-10 for illustrative purposes. Flow diagram 1100, however, may not be limited to the embodiments disclosed by FIGS. 1-10.

Complexity detection according to the disclosed embodiments may be implemented in RIP system 110. In some embodiments, complexity detection may be implemented within controller 106. Within RIP system 110, job 103 is received by front end 302. If job 103 is to undergo a page complexity determination process, then front end 302 sets a complexity page detection flag 1104 during the page start request to the RIPs within RIP system 110. Front end 302 may set complexity flag 1104 after being notified that the current storage location, such as memory 506, is not available or that space is not available in the current storage location. Step 1102 executes by determining that the storage location according to hierarchy 502 is not available, as disclosed, for example, by step 804 in flow diagram 800.

Renderer 418 may receive a page 1105 from job 103. Renderer 418 does a preflight inspection of page 1105 and collects statistics, only of complexity flag 1104 is true. Step 1106 is executed by detecting page complexity for page 1105 by renderer 418. Renderer 418 may determine the page complexity for page 1105 based on a weighted formula and a set of rules. These features are disclosed in greater detail below. Using the information gathered and determined, the disclosed embodiments determine whether page 1105 is complex.

Step 1108 executes by determining whether page 1105 is complex. This process is disclosed in greater detail below. If step 1108 is yes, then page 1105 is a complex page. Step 1112 executes by storing rendered page 1105 in memory 506 by the associate RIP, as disclosed above. Specifically, rendered page 1105 may be added to rendered pages 630 of memory 506 with a location within the storage to retrieve the rendered page. In other embodiments, hierarchy 502 may specify that renderer 418 store rendered page 1105 in SSD 508 or HDD 510, if memory 506 is not available. Step 1113 executes by returning to front end 302 with the storage location of rendered page 1105.

If step 1108 is no, then page 605 is a simple, or non-complex, page. Step 1114 executes by not rendering and not storing a simple page. The RIP will not render or store page 605, for example, in memory 506. A simple page may be rendered when printing operations commence without any significant impact on print engine 260. These pages do not need to take up storage space if space is not readily available.

Figure 12:
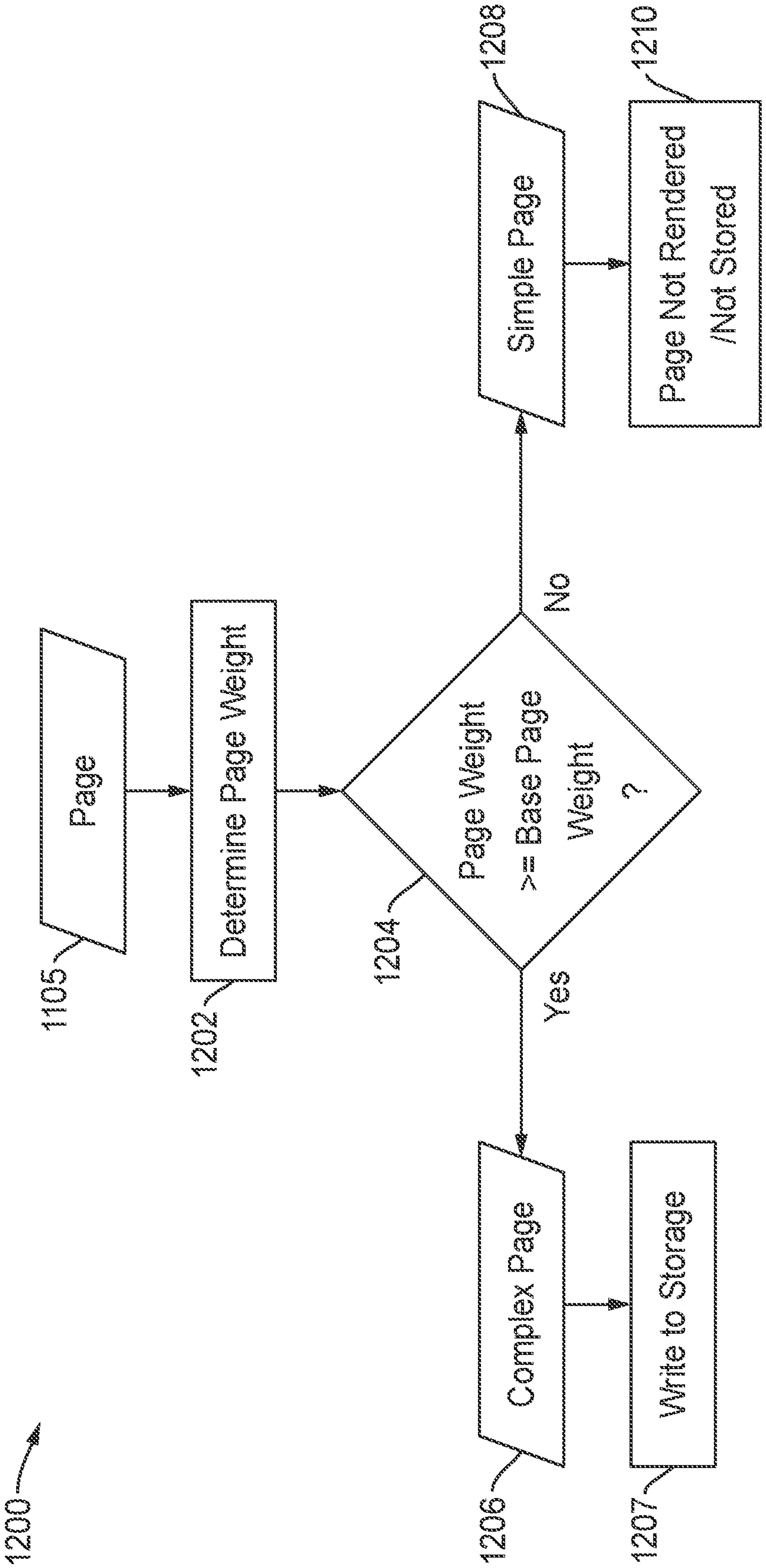
FIG. 12 illustrates a flow diagram for page complexity determination according to the disclosed embodiments.

FIG. 12 depicts flow diagram 1200 for page complexity determination according to the disclosed embodiments. Flow diagram 1200 may refer to FIGS. 1-11 for illustrative purposes. Flow diagram 1200, however, is not limited by the embodiments disclosed by FIGS. 1-11. Flow diagram 1100 may be implemented in RIP system 110. More specifically, it may be implemented in an interpreter 402 or renderer 418 of a RIP within RIP system 110. In other embodiments, flow diagram 1200 may be implemented elsewhere within printing system 100, such as controller 106.

Page 1105 is received at RIP 400 having renderer 418. Page 1105 may be part of job 103. According to the disclosed embodiments, it is determined that the storage location for rendered pages of the job is not available or is limited so that the entire data set for the rendered pages cannot be stored. The disclosed embodiments determine if page 1105 is complex. Step 1202 executes by determining a page weight for page 1105. This process is disclosed in greater detail below and is based on a set of rules and a weighted formula. Step 1204 executes by determining whether the page weight is greater than or equal to a base page weight. The base page weight is disclosed in greater detail below and is determined based on the engine speed of print engine 260. Thus, determining whether a page is complex relates to whether the page can be rendered "at speed" during printing operations.

If step 1204 is yes, then page 1105 is marked as a complex page in step 1206. Referring to flow diagram 1100, page 1105 is stored in a storage location accessible by RIP system 110. Thus, step 1207 executes by writing rendered page 1105 to the storage. In some embodiments, the storage location may be memory 506 if there is space available. If no space is available, then the disclosed embodiments follow hierarchy 502 to store rendered page 1105 at SSD 508 or HDD 510. If step 1204 is no, then page 1105 is marked as a simple page in step 1208. Step 1210 executes by not rendering and not storing page 1105 so that it may be rendered at a subsequent point in time.

Figure 13:
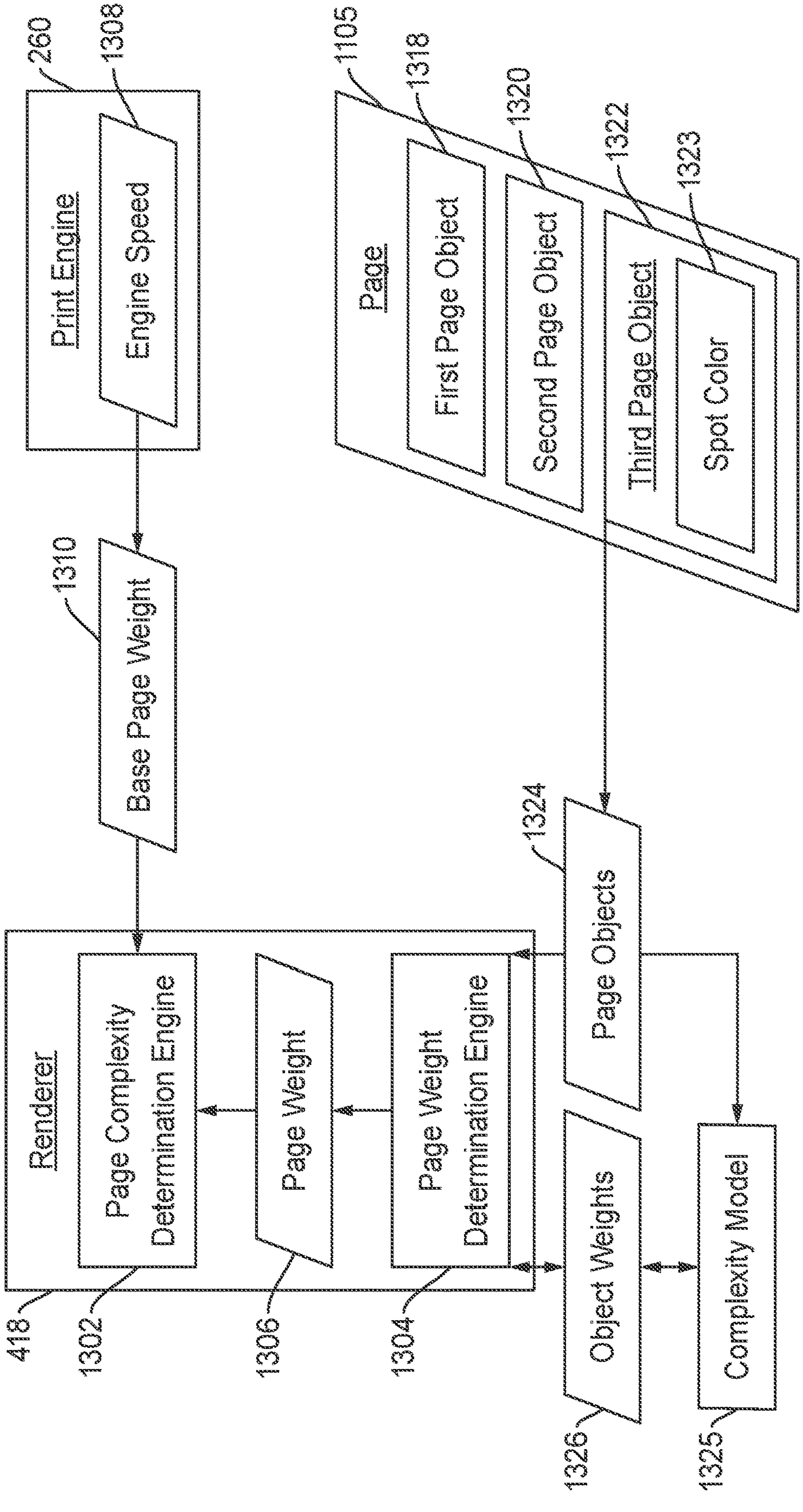
FIG. 13 illustrates a block diagram of the components used for page complexity determination according to the disclosed embodiments.

FIG. 13 depicts a block diagram of the components used for page complexity determination according to the disclosed embodiments. As disclosed above, base page weight 1310 and page weight 1306 are determined to be used in deciding whether page 1105 is complex or simple. Both of these values are calculated using information available from printing device 104 and objects within page 605. These features are disclosed in greater detail below.

Base page weight 1310 relates to engine speed 1308 of print engine 260 of printing device 104. Engine speed 1308 may refer to the pages or sheet per minute that printing engine 260 can process, or put ink to paper. This speed may refer to an average speed for a number of previous print jobs, or to the speed to print a page having no objects, such as one with only text. The disclosed embodiments may assign a weight, or value, to engine speed 1308.

For example, print engine 260 may have an engine speed 1308 of 150 PPM. This value may be based off previous print jobs and their engine speed to print pages of those jobs, regardless of the content on those pages. Alternatively, the disclosed embodiments may take the engine speed of printing certain types of pages, such as text only, pages with objects, pages with color printing, and the like. Using this example, base page weight 1310 for engine speed 1308 of 150 PPM may be 10.0.

For determining page weight 1306, a page weight determination engine 1304 may be implemented within renderer 418 of a RIP within RIP system 110. Page weight determination engine 1304 also may be implemented elsewhere in controller 106, print management server 108, or RIP system 110. Page weight determination engine 1304 may take into account page objects 1324 from page 1105 and object weights 1326. These features are disclosed separately below.

Page objects 1324 are objects, such as images, graphics, text, and the like, within page 1105. For example, page 1105 may include first page object 1318, second page object 1320, and third page object 1322. Third page object 1322 may include a spot color 1323 that is required to print the third page object accurately. As disclosed above, an object may have a type, such as vector, text, or image. Objects may be further classified into operators, such as form, shading, group, Type 3 characters, pattern, font, color space, spot color, and the like. For example, first page object 1318 may be a vector object having shading as an operator, second page object 1320 may be a text object having a specific font and several Type 3 characters as operators, and third page object 1322 may be an image object having spot color 1323 as an operator.

The disclosed embodiments may compile the page objects and their operators into page objects 1324 for page 1105. Page objects 1324 are provided to page weight determination engine 1304. Page weight determination engine 1304 may use one or more weighted formulas to determine the weights for page objects 1324. The weighted formulas may rely on object weights 1326 provide from complexity model 1325. The disclosed embodiments gather statistics and generates complexity model 1325 based on these determinations. Complexity model 1325 is based on various components of a page, such as the type of objects disclosed above, or vector, text, or image. The objects in complexity model 1325 also may be further classified into operators.

When page weight determination engine 1304 receives page objects 1324 of page 1105, it may retrieve object weights from complexity model 1325. Alternatively, page objects 1324 may be provided to complexity model 1325, which then provides page object 1324 along with object weights 1326 to page weight determination engine 1304. First page object 1318 may be compared to a similar page object in complexity model 1325 to obtain a weight for the first page object. Second page object 1320 may compared to a similar page object in complexity model 1325 to obtain a weight for the second page object. Third page object 1322 may be compared to a similar page object in complexity model 1325 to obtain a weight for the third page object. In some embodiments, the object weights for first page object 1318, second page object 1320, and third page object 1322 may be added together to determine page weight 1306.

Page complexity determination engine 1302 applies the rule that a page is marked complex if page weight 1306 exceeds base page weight 1310. If page weight 1306 exceeds base page weight 1310, then page 1105 is marked complex. If page weight 1306 is equal or less than base page weight 1310, then page 1105 is marked as simple. Referring to the embodiments disclosed above, a complex page is stored in the storage location while a simple page may be discarded.

Figure 14:
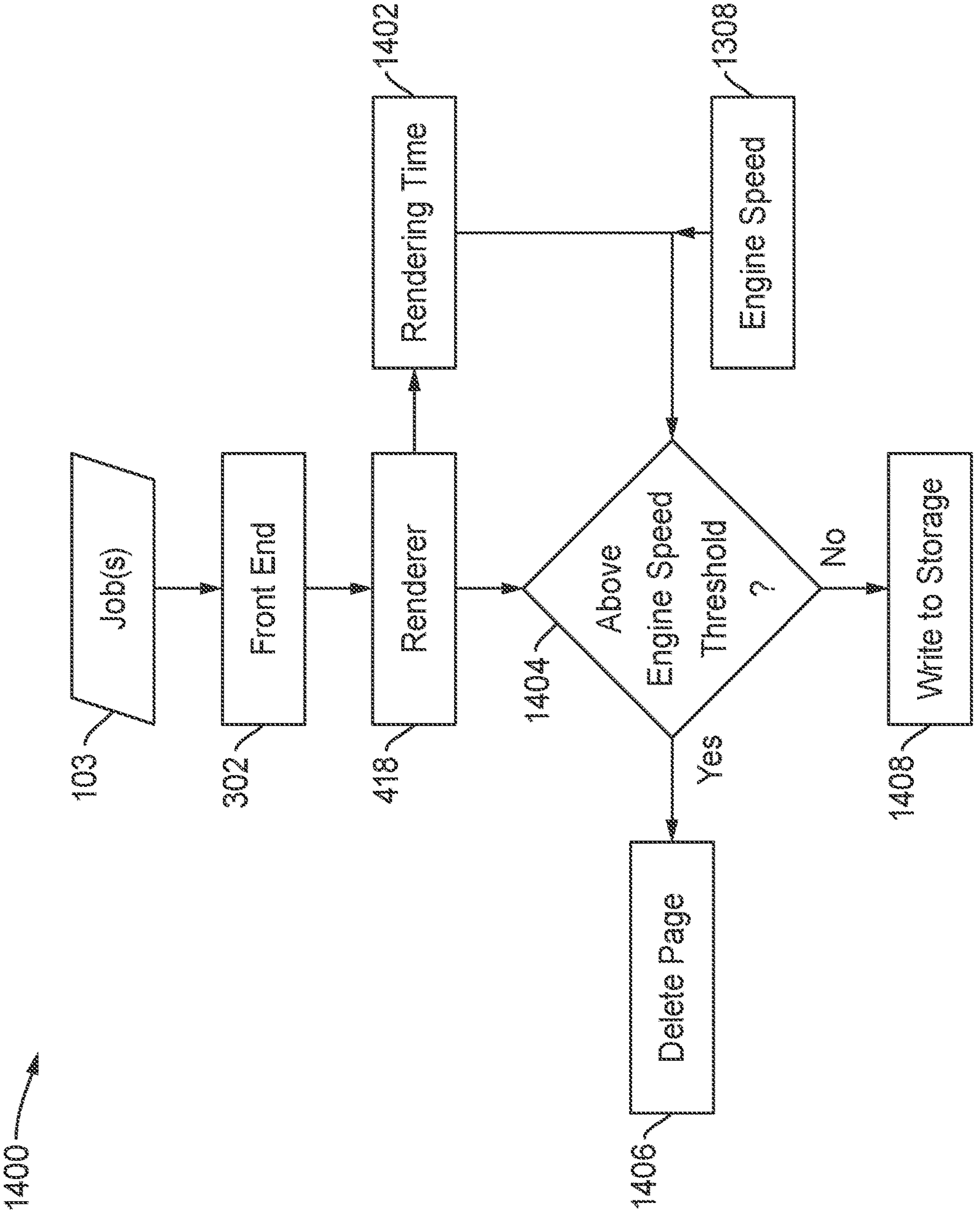
FIG. 14 illustrates a flow diagram for managing printing operations using rendering time for a page according to the disclosed embodiments.

FIG. 14 depicts a flow diagram 1400 for managing printing operations using rendering time for a page 1105 according to the disclosed embodiments. Flow diagram 1400 may refer to FIGS. 1-13 for illustrative purposes. Flow diagram 1400, however, is not limited to the embodiments disclosed by FIGS. 1-13.

As noted above, the disclosed embodiments may use whether the page being rendered is a complex page to determine whether it should be stored or deleted. Alternatively, the disclosed embodiments may use actual rendering time for the pages in order to determine which pages should be retained after the job is processed or printed. If the disclosed embodiments are storing rendered data to a memory 506, SSD 508, or HDD 510 because of the type of job, then the disclosed embodiments may choose to discard rendered data for pages that processed above the required engine speed because this data can be regenerated without impacting production. In embodiments alternating between memory 506 and SSD 508 or HDD 510, the disclosed embodiments may choose to do the same with an additional operation to move pages from memory 506 to SSD 508 or HDD 510 in order to preserve the rendered data for these pages.

Print job 103 is received and processed by RIP system 110. As disclosed above, front end 302 may provide each page of print job 103 to RIP system 110, and, specifically, to renderer 418. Renderer 418 may determine an actual rendering time 1402 to process page 1105 within RIP system 110. Rendering time 1402 may be determined before any determination of page complexity is done.

Step 1404 executes by determining whether rendering time 1402 is above a threshold. This threshold may be related to engine speed 1308, disclosed above. In other words, step 1404 determines whether the speed to render page 1105 is greater than engine speed 1308. If so, then this features indicates that rendering page 1105 again will not impact print engine 160. If rendering time 1402 indicates that page 1105 cannot be rendered to match or exceed engine speed 1308, then page 1105 should be stored to prevent impacting the processing at print engine 260 when print job 103 is printed.

Thus, if step 1404 is yes, then step 1406 executes by deleting page 1105 from the rendered pages being stored in the storage location, as determined by front end 302 or renderer 418. If step 1404 is no, then step 1408 executes by writing page 1105 to storage. These embodiments make a preliminary determination whether to discard the page without having to perform the complex page analysis disclosed above. In other embodiments, the complex page determination process may be performed after the embodiments disclosed by flow diagram 1400.

In some embodiments, the results of the complex page or rendering time determinations may move indicated pages from memory 506 to SSD 508 or HDD 510. This feature keeps the space available in memory 506 for the type of jobs that are being printed or handled later, such as process and hold or proof and hold. Thus, the embodiments disclosed by FIGS. 11-14 may be combined with those disclosed by FIGS. 1-10 to provide robust printing operations management using multiple storage locations 602.

Figure 15:
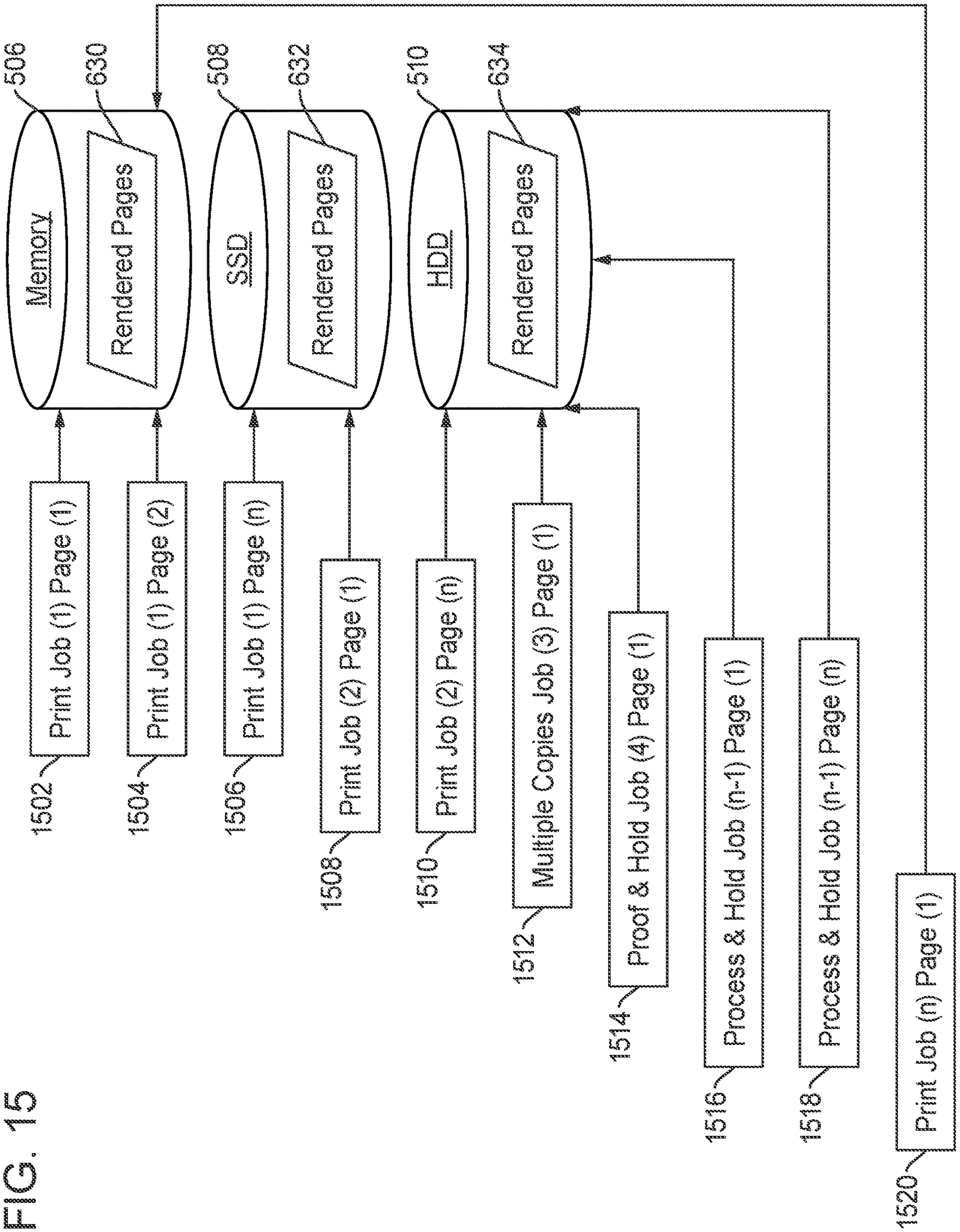
FIG. 15 illustrates a block diagram of an example process of rendering print jobs to multiple storage locations for printing operations according to the disclosed embodiments.

FIG. 15 depicts a block diagram of an example process of rendering print jobs to multiple storage locations for printing operations according to the disclosed embodiments. As shown in FIG. 15, the disclosed embodiments manage various storage locations, or memory 506, SSD 508, and HDD 510, in the printing system for the rendered pages of print jobs. Multiple print jobs may be managed using the disclosed embodiments. Hierarchy 502, disclosed above, of the storage locations is maintained based on the efficiency of the storage I/O, size of storage, and the type of job. The rendering of the job starts with one storage area and automatically switches to another storage depending on system events and space availability. These features involve making all components of the printing system aware as to where a rendered page resides.

Operation 1502 includes storing rendered page 1 of print job 1 to rendered pages 630 of memory 506. Memory 506 includes enough space available to store this page of print job 1. Operation 1504 includes storing rendered page 2 of print job 1 to rendered pages 630 of memory 506. At this point, memory 506 may not be available. For example, after storing rendered page 2 in operation 1504, no more space is available in memory 506. Operation 1506, therefore, includes storing rendered page n of print job 1 to rendered pages 632 of SSD 508. Hierarchy 502 may indicate that SSD 508 is the location for storing rendered pages if memory 506 is not available. The remaining pages of print job 1 may be stored at SSD 508. Front end 302 is notified of that the location of pages 1 and 2 of print job 1 are stored in memory 506 and page n is stored in SSD 508.

Because memory 506 is not available, pages from print job 2 also are stored at SSD 508. Operation 1508 includes storing page 1 of print job 2 to rendered pages 632 of SSD 508. After this operation, however, SSD 508 may indicate to front end 302 that it also does not have enough space available to store the rest of the rendered pages for print job 2. Thus, hierarchy 502 indicates that storing operations move to HDD 510, as it has additional storage space greater than memory 506 and SSD 508. As a result, operation 1510 includes storing page n of print job 2 to rendered pages 634 of HDD 510.

Job 3 may be a collated copies job, as disclosed above. According to hierarchy 502, this type of job is not stored on memory 506, but on SSD 508 or HDD 510. Because SSD 508 is not available, renderer 418 will store pages for job 3 at rendered pages 634 of HDD 510. Thus, operation 1512 includes storing multiple copies of page 1 of job 3 at rendered pages 634. Job 4 is a proof and hold job. According to hierarchy 502, proof and hold jobs are not stored on memory 506 but at one of the storage drives. As SSD 508 is not available, operation 1514 includes storing page 1 of proof and hold job 4 at rendered pages 634 of HDD 510.

A process and hold job n−1 also is received. It also is treated as a delayed job so it also is stored on HDD 510. Operation 1516 includes storing page 1 of process and hold job n−1 at rendered pages 634 of HDD 510. Operation 1518 includes storing page n of process and hold job n−1 at rendered pages 634. Thus, all of process and hold job n−1 may be stored on HDD 510.

At some instance, pages 1 and 2 of print job 1 are printed. The rendered pages in rendered pages 630 may be deleted.

Thus, when print job n is received at RIP system 110, the disclosed embodiments may determine that space is now available on memory 506. As print job n is not a proof and hold job, a process and hold job, or a collated copies job, it may be stored on memory 506 is space is available. Front end 302 finds out that space is available so that operation 1520 includes storing page 1 of print job n at rendered pages 630 of memory 506.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing printing operations, the method comprising:

receiving a print job having a plurality of pages to be printed at a printing device;

creating a hierarchy of storage drives where the plurality of pages is to be stored;

rendering the plurality of pages using a raster image processing (RIP) system for the printing device;

determining that printing the print job is to be deferred to a subsequent time period depending on a job type of the print job;

determining that at least one page of the rendered plurality of pages is a complex page based on a page weight for the at least one page of the second set of pages exceeding a base page weight; and storing the rendered plurality of pages in a first storage drive of the hierarchy of storage drives accessible by the RIP system according to the job type based on the determination of the complex page, wherein the first storage drive has a higher capacity storage than a memory accessible by the RIP system.

2. The method of claim 1, wherein the first storage drive is a solid state drive.

3. The method of claim 1, further comprising determining the first storage drive cannot store at least one page of the rendered plurality of pages due to a storage limitation.

4. The method of claim 3, further comprising moving to a second storage drive of the hierarchy of storage drives accessible by the RIP system, wherein the second storage drive has a higher storage capacity than the memory accessible by the RIP system; and storing the at least one page of the rendered plurality of pages in the second storage drive.

5. The method of claim 1, further comprising communicating that the rendered plurality of pages is stored in the first storage drive; and retrieving the rendered plurality of pages from the first storage drive by an engine manager of the RIP system to provide to a print engine during the subsequent time period.

6. The method of claim 1, wherein the first storage drive is a hard disk drive.

7. The method of claim 1, further comprising notifying a front end of the RIP system of the first storage drive storing the rendered plurality of pages in the hierarchy of storage drives.

8. The method of claim 1, further comprising deleting, by the front end, the rendered plurality of pages from the first storage drive after the print job is printed at the printing device.

9. The method of claim 1, further comprising printing a first copy of the print job after the rendering step.

10. The method of claim 9, further comprising printing an additional copy of the print job during the subsequent time period.

* * * * *